US012724389B2

(12) United States Patent
Tahara et al.

(10) Patent No.: US 12,724,389 B2
(45) Date of Patent: Sep. 1, 2026

(54) CONTROL SYSTEM, DATA PROVIDING METHOD, AND RELAY PROCESSING PROGRAM

(71) Applicant: OMRON CORPORATION, Kyoto (JP)

(72) Inventors: Yutaka Tahara, Kyoto (JP); Yuta Nagata, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 385 days.

(21) Appl. No.: 18/553,140

(22) PCT Filed: Mar. 17, 2022

(86) PCT No.: PCT/JP2022/012246
§ 371 (c)(1),
(2) Date: Sep. 28, 2023

(87) PCT Pub. No.: WO2022/230429
PCT Pub. Date: Nov. 3, 2022

(65) Prior Publication Data
US 2024/0184256 A1 Jun. 6, 2024

(30) Foreign Application Priority Data
Apr. 28, 2021 (JP) ................................ 2021-075642

(51) Int. Cl.
*G05B 15/02* (2006.01)

(52) U.S. Cl.
CPC ................................... *G05B 15/02* (2013.01)

(58) Field of Classification Search
CPC ...... G05B 15/02; H04L 67/02; G06F 16/9032
See application file for complete search history.

(56) References Cited

U.S. PATENT DOCUMENTS 6,061,738 A 5/2000 Osaku et al.
6,957,224 B1 10/2005 Megiddo et al.
(Continued)

FOREIGN PATENT DOCUMENTS

CN 1484154 A 3/2004
CN 107733972 A 2/2018
(Continued)

OTHER PUBLICATIONS

Ishibashi, Hayato, “New Internet Construction Technique”, Unix User, Mar. 1, 1995, vol. 4, No. 3, pp. 98-106.
(Continued)

*Primary Examiner* — Yongjia Pan
(74) *Attorney, Agent, or Firm* — Sughrue Mion, PLLC

(57) ABSTRACT

A control system includes: a processing unit configured to determine processing for a control device or a device connected to the control device in accordance with an access request; a providing unit configured to transmit data acquired by performing the determined processing to a transmission source of the access request; a storage unit configured to store a character string definition including at least one combination of a first character string and a second character string longer than the first character string; and an interpretation unit configured to replace the first character string included in the access request with a second character string associated with the first character string by referring to the character string definition.

17 Claims, 17 Drawing Sheets

(56) References Cited

U.S. PATENT DOCUMENTS 8,812,737 B2 * 8/2014 Bilinski .............. G06F 16/9566 709/217
9,948,577 B2 * 4/2018 Chanda ................... H04L 49/35
10,637,724 B2 * 4/2020 Johnson .............. H04W 12/062
10,733,257 B2 * 8/2020 Zheng ..................... H04L 67/63
10,798,053 B2 * 10/2020 Nolan ..................... H04L 61/30
10,798,056 B2 * 10/2020 Zhou .................. G06F 16/9566
2003/0182601 A1 9/2003 Richardson
2004/0088368 A1 * 5/2004 Burrell .................. G06F 11/328 709/224
2007/0118884 A1 * 5/2007 Ozaki ................. H04L 63/0407 726/5
2011/0153583 A1 * 6/2011 Goldband ........... G06F 16/9566 707/723
2012/0135692 A1 * 5/2012 Feri ........................ G08C 23/04 455/67.14
2013/0060889 A1 * 3/2013 Miyazawa ............ H04L 67/563 709/217
2014/0297806 A1 10/2014 Hwang et al.
2015/0161282 A1 * 6/2015 Low ...................... H04L 67/306 709/203
2015/0370899 A1 * 12/2015 Jung ....................... H04L 67/02 707/722
2016/0248837 A1 * 8/2016 Cai ......................... H04L 67/55
2017/0201496 A1 * 7/2017 Luff .......................... H04L 9/14
2020/0097513 A1 3/2020 Zheng
2021/0185472 A1 * 6/2021 Klein ...................... H04L 63/20

FOREIGN PATENT DOCUMENTS

| | | | |
|---|---|---|---|
| CN | 110134889 | A | 8/2019 |
| EP | 3 605 352 | A1 | 2/2020 |
| JP | 2007-336401 | A | 12/2007 |
| JP | 2008-310532 | A | 12/2008 |
| JP | 2020-013223 | A | 1/2020 |
| JP | 2020-013224 | A | 1/2020 |

OTHER PUBLICATIONS

International Search Report for PCT/JP2022/012246 dated Jun. 21, 2022 (PCT/ISA/210).

Written Opinion for PCT/JP2022/012246 dated Jun. 21, 2021 (PCT/ISA/237).

Communication dated Mar. 13, 2025 issued by European Patent Office in counterpart Application No. 22795351.0.

Communication dated Aug. 26, 2025 issued by China Patent Office in counterpart Application No. 202280024351.9.

* cited by examiner 1
4
2
400
(1) QUERY
(4) RESPONSE DATA
100
(2) PERFORMANCE
OF PROCESSING
(3) DATA ACQUISITION
200-1
200-2
200-3
250-1
250-2
250-3
6-1
6-2
6-3

100
30
STORAGE UNIT
180
ALIAS DEFINITION
20
INTERPRETATION UNIT
ACCESS REQUEST (QUERY)
10
PROCESSING UNIT
CONTROL DEVICE, DEVICE, AND OTHERS
RESPONSE DATA
40
PROVIDING UNIT

| ALIAS NAME | CHARACTER STRING |
| --- | --- |
| temperature | eip=192.168.250.100&unitno=0x01&iolink=port1&Index=0x12&format=json |
| SDCardError | get_values="_AlarmFlags,_Card1Err"&format=json |
| ... | ... |

FIG.7

| TYPE OF OPERATION | EXAMPLE |
|---|---|
| NUMERIC OPERATION | +, −, *, /, , %, ^ |
| LOGICAL OPERATION | &&, \|\|, ! |
| COMPARISON OPERATION | ==, !=, <, <=, >, >=, |
| BIT OPERATION | !, &, ^, ~, <<, >> |
| SIGNIFICANT DIGIT OPERATION (ROUNDING OFF, ROUNDING DOWN, ROUNDING UP) | ROUND(DATA, NUM_DIGITS)<br>ROUNDUP(DATA, NUM_DIGITS)<br>ROUNDDOWN(DATA, NUM_DIGITS) |
| UNIT CONVERSION (DISTANCE, WEIGHT, SPEED, TEMPERATURE) | CONVERT(DATA, UNITFROM, UNITTO) |

(A)
http://host/sys.cgi?eip=192.168.250.100&unitno=0x01&iolink=port1&index=0x12&format=json
500
502
504
505
506
507
508
(B)
http://host/sys.cgi?get_alias=temperature
510
502
512
514
(C)
http://host/sys.cgi?get_alias=EIPSlave001&NXUnit01&IOLink_P1&Temp1&format=json
520
502
512
524
525
526
527
508
(D)
http://host/sys.cgi?get_alias=EIPSlave001&Temperature01&format=json
530
502
512
524
536
508

(A)
http://host/sys.cgi?get_values=“_AlarmFlags._Card1Err”&format=json
540
502
542
http://host/sys.cgi?get_alias=SDCardError
548
502
546
http://host/sys.cgi?get_values=“_AlarmFlags._Card1Err,_SystemErr”&format=json
541
502
543
(B)
180
SDCardError
get_values=“_AlarmFlags._Card1Err” &format=json
UPDATE
SDCardError
get_values=“_AlarmFlags._Card1Err, _SystemErr”&format=json

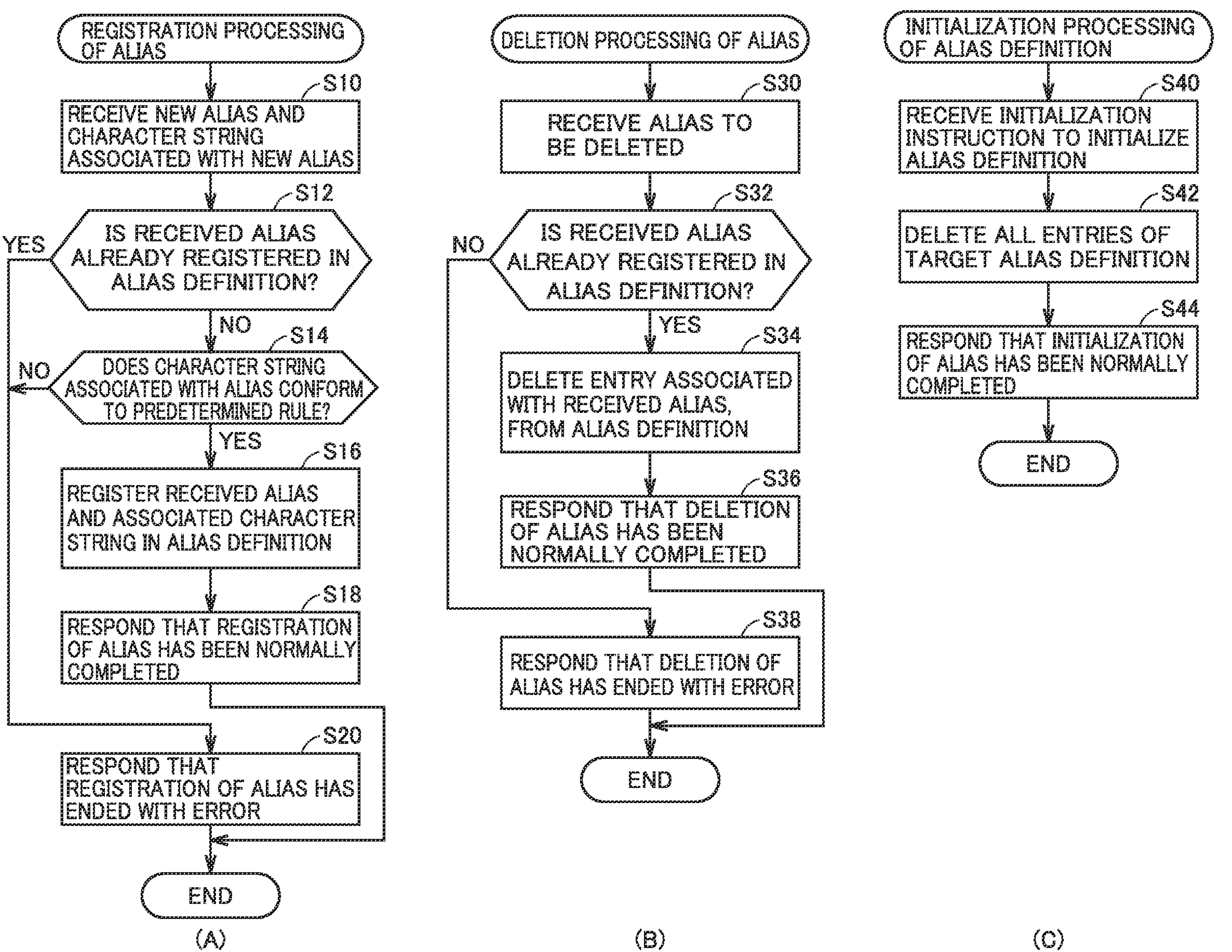
FIG.10
REGISTRATION PROCESSING OF ALIAS
S10
RECEIVE NEW ALIAS AND CHARACTER STRING ASSOCIATED WITH NEW ALIAS
S12
IS RECEIVED ALIAS ALREADY REGISTERED IN ALIAS DEFINITION?
YES
NO
S14
DOES CHARACTER STRING ASSOCIATED WITH ALIAS CONFORM TO PREDETERMINED RULE?
NO
YES
S16
REGISTER RECEIVED ALIAS AND ASSOCIATED CHARACTER STRING IN ALIAS DEFINITION
S18
RESPOND THAT REGISTRATION OF ALIAS HAS BEEN NORMALLY COMPLETED
S20
RESPOND THAT REGISTRATION OF ALIAS HAS ENDED WITH ERROR
END
(A)
DELETION PROCESSING OF ALIAS
S30
RECEIVE ALIAS TO BE DELETED
S32
IS RECEIVED ALIAS ALREADY REGISTERED IN ALIAS DEFINITION?
NO
YES
S34
DELETE ENTRY ASSOCIATED WITH RECEIVED ALIAS, FROM ALIAS DEFINITION
S36
RESPOND THAT DELETION OF ALIAS HAS BEEN NORMALLY COMPLETED
S38
RESPOND THAT DELETION OF ALIAS HAS ENDED WITH ERROR
END
(B)
INITIALIZATION PROCESSING OF ALIAS DEFINITION
S40
RECEIVE INITIALIZATION INSTRUCTION TO INITIALIZE ALIAS DEFINITION
S42
DELETE ALL ENTRIES OF TARGET ALIAS DEFINITION
S44
RESPOND THAT INITIALIZATION OF ALIAS HAS BEEN NORMALLY COMPLETED
END
(C)

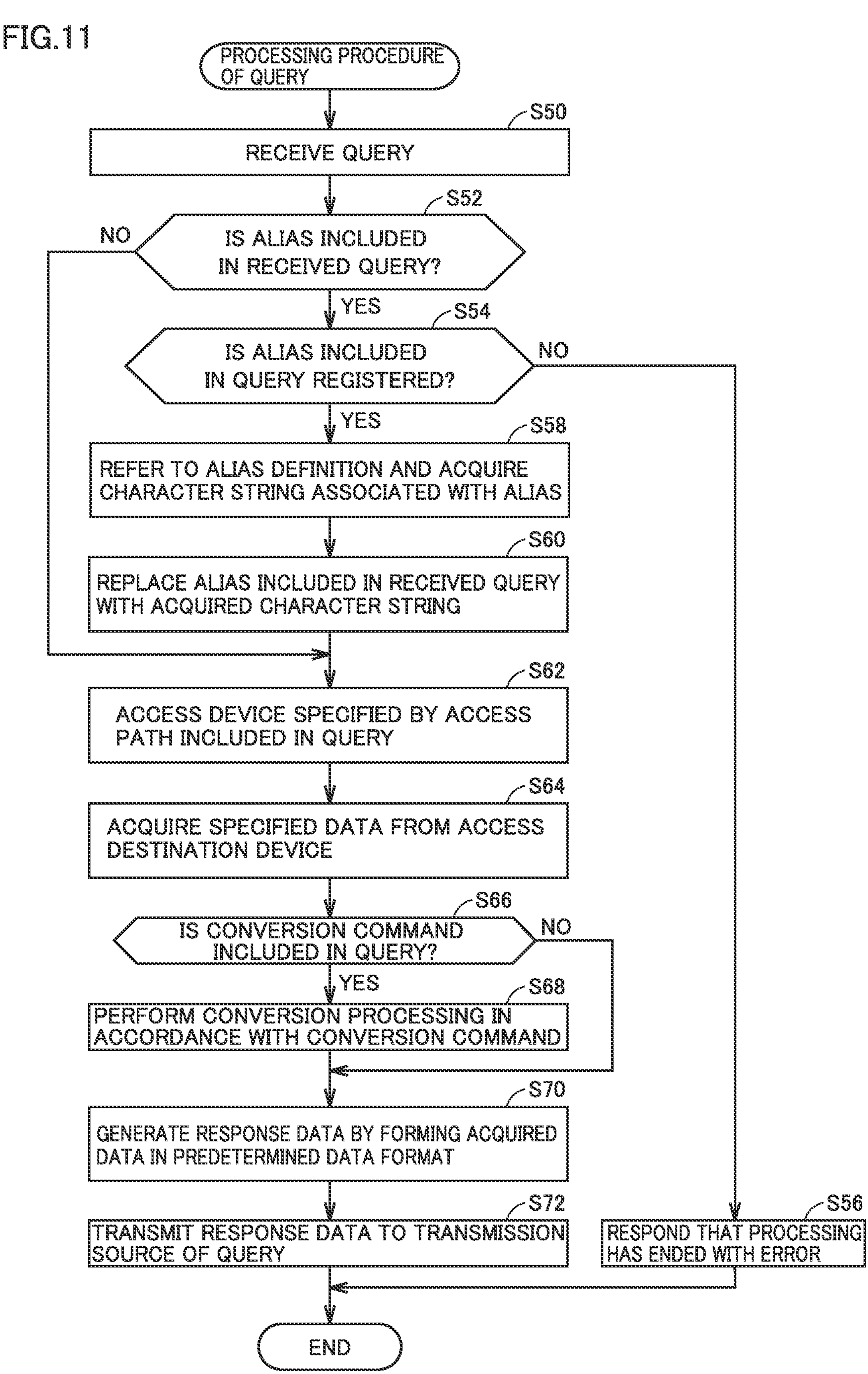
FIG.11
PROCESSING PROCEDURE OF QUERY
S50
RECEIVE QUERY
S52
IS ALIAS INCLUDED IN RECEIVED QUERY?
NO
YES
S54
IS ALIAS INCLUDED IN QUERY REGISTERED?
NO
YES
S58
REFER TO ALIAS DEFINITION AND ACQUIRE CHARACTER STRING ASSOCIATED WITH ALIAS
S60
REPLACE ALIAS INCLUDED IN RECEIVED QUERY WITH ACQUIRED CHARACTER STRING
S62
ACCESS DEVICE SPECIFIED BY ACCESS PATH INCLUDED IN QUERY
S64
ACQUIRE SPECIFIED DATA FROM ACCESS DESTINATION DEVICE
S66
IS CONVERSION COMMAND INCLUDED IN QUERY?
NO
YES
S68
PERFORM CONVERSION PROCESSING IN ACCORDANCE WITH CONVERSION COMMAND
S70
GENERATE RESPONSE DATA BY FORMING ACQUIRED DATA IN PREDETERMINED DATA FORMAT
S72
TRANSMIT RESPONSE DATA TO TRANSMISSION SOURCE OF QUERY
S56
RESPOND THAT PROCESSING HAS ENDED WITH ERROR
END

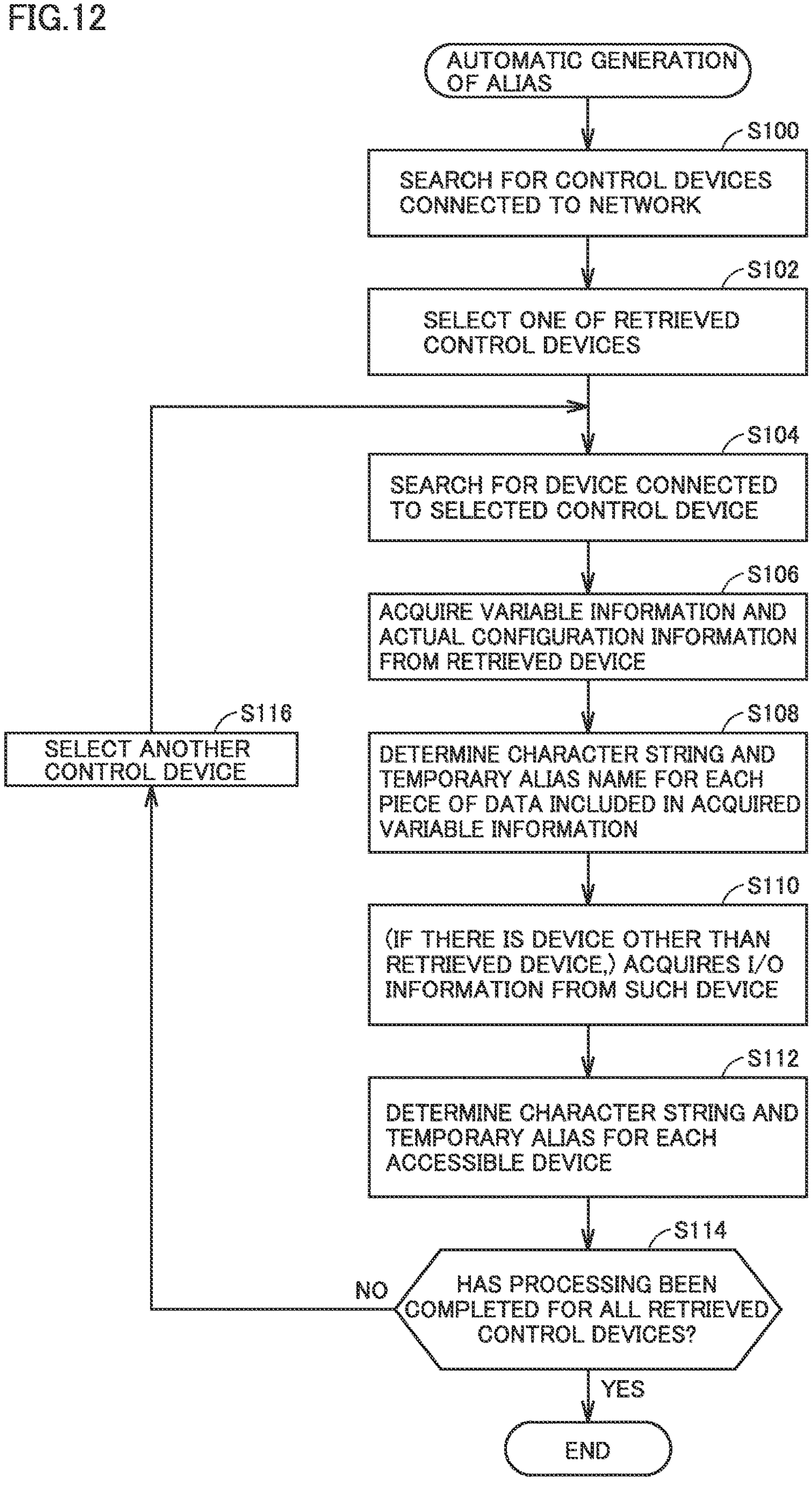
FIG.12
AUTOMATIC GENERATION OF ALIAS
S100
SEARCH FOR CONTROL DEVICES CONNECTED TO NETWORK
S102
SELECT ONE OF RETRIEVED CONTROL DEVICES
S104
SEARCH FOR DEVICE CONNECTED TO SELECTED CONTROL DEVICE
S106
ACQUIRE VARIABLE INFORMATION AND ACTUAL CONFIGURATION INFORMATION FROM RETRIEVED DEVICE
S108
DETERMINE CHARACTER STRING AND TEMPORARY ALIAS NAME FOR EACH PIECE OF DATA INCLUDED IN ACQUIRED VARIABLE INFORMATION
S110
(IF THERE IS DEVICE OTHER THAN RETRIEVED DEVICE,) ACQUIRES I/O INFORMATION FROM SUCH DEVICE
S112
DETERMINE CHARACTER STRING AND TEMPORARY ALIAS FOR EACH ACCESSIBLE DEVICE
S114
HAS PROCESSING BEEN COMPLETED FOR ALL RETRIEVED CONTROL DEVICES?
NO
YES
S116
SELECT ANOTHER CONTROL DEVICE
END

FIG.14

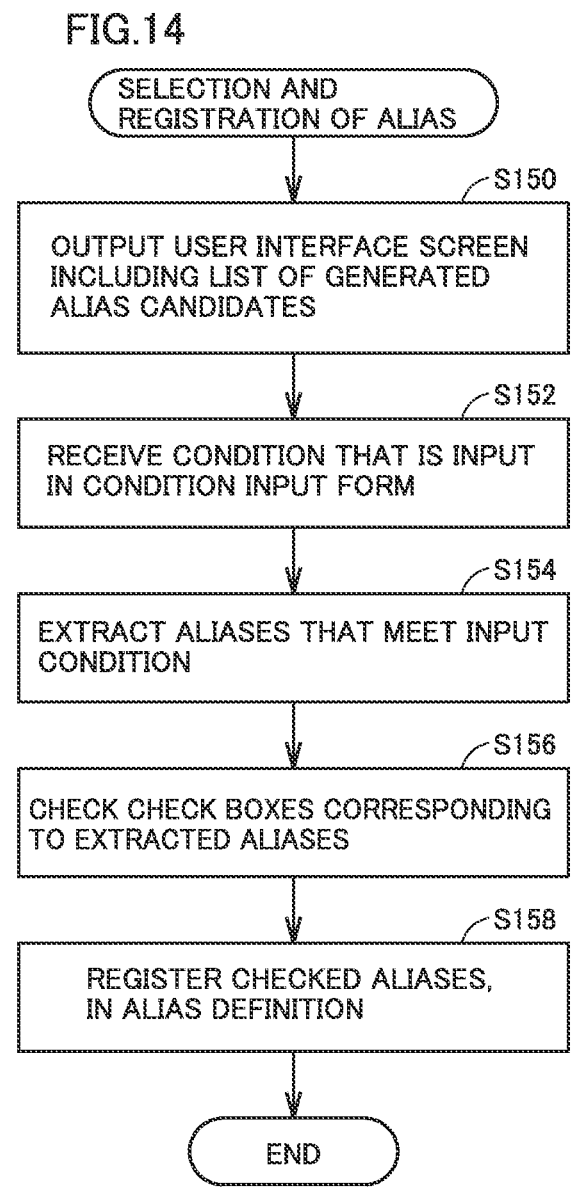

SELECTION AND REGISTRATION OF ALIAS

S150 OUTPUT USER INTERFACE SCREEN INCLUDING LIST OF GENERATED ALIAS CANDIDATES

S152 RECEIVE CONDITION THAT IS INPUT IN CONDITION INPUT FORM

S154 EXTRACT ALIASES THAT MEET INPUT CONDITION

S156 CHECK CHECK BOXES CORRESPONDING TO EXTRACTED ALIASES

S158 REGISTER CHECKED ALIASES, IN ALIAS DEFINITION

END

FIG.15

(A) CHANGE IN NETWORK CONFIGURATION
(CHANGE OF NETWORK ADDRESS)

NETWORK A
DEVICE A
192.168.1.1/24
DEVICE B
192.168.1.2/24
DEVICE C
192.168.1.3/24

NETWORK B
DEVICE A
192.168.2.1/24
DEVICE B
192.168.2.2/24
DEVICE C
192.168.2.3/24

186 188

"MachineA_Module1Status"= eip=192.168.1.1&ecatno=0x01&OD=0xXXXX, 0xYY
"MachineA_Module2Status"= eip=192.168.1.1&ecatno=0x02&OD=0xXXXX, 0xYY
"MachineA_Module3Status"= eip=192.168.1.1&ecatno=0x03&OD=0xXXXX, 0xYY
...

186 188

"MachineA_Module1Status"= eip=192.168.2.1&ecatno=0x01&OD=0xXXXX, 0xYY
"MachineA_Module2Status"= eip=192.168.2.1&ecatno=0x02&OD=0xXXXX, 0xYY
"MachineA_Module3Status"= eip=192.168.2.1&ecatno=0x03&OD=0xXXXX, 0xYY
...

(B) CHANGE OF MODULE IN CONTROL DEVICE
(REPLACEMENT OF IN-DEVICE MODULE)

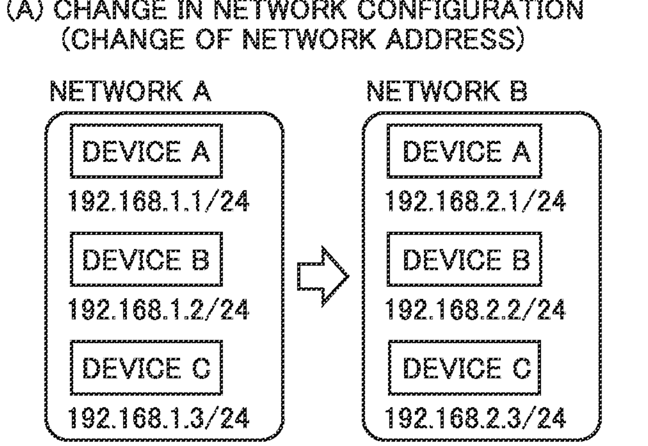

186 188

"MachineA_ModuleAStatus" = eip=192.168.1.1&ecatno=0x01&OD=0xAAAA, 0xAA
"MachineA_ModuleAError" = eip=192.168.1.1&ecatno=0x01&OD=0xBBBB, 0xBB
"MachineA_ModuleADistance"= eip=192.168.1.1&ecatno=0x01&OD=0xCCCC, 0xCC
...

186 188

"MachineA_ModuleBStatus" = eip=192.168.1.1&ecatno=0x10&OD=0xAAAA, 0xAA
"MachineA_ModuleBError" = eip=192.168.1.1&ecatno=0x10&OD=0xBBBB, 0xBB
"MachineA_ModuleBInput" = eip=192.168.1.1&ecatno=0x10&OD=0xXXXX, 0xYY
...

(A) CHANGE IN NETWORK CONFIGURATION
(CHANGE OF NETWORK ADDRESS)
NETWORK A
DEVICE A
192.168.1.1/24
DEVICE B
192.168.1.2/24
DEVICE C
192.168.1.3/24
NETWORK B
DEVICE A
192.168.2.1/24
DEVICE B
192.168.2.2/24
DEVICE C
192.168.2.3/24
600
198.168.1.1
NX102.9000
198.168.1.2
NX102.9000
198.168.1.3
NX102.9000
Change IP Address
×
New IP Address : 192 . 168. 2 . 1
602
OK
Cancel
INTERLOCK
186
188
"MachineA_Module1Status"= eip=192.168.1.1&ecatno=0x01···
···
186
188
"MachineA_Module1Status"= eip=192.168.2.1&ecatno=0x01···
···

FIG.17

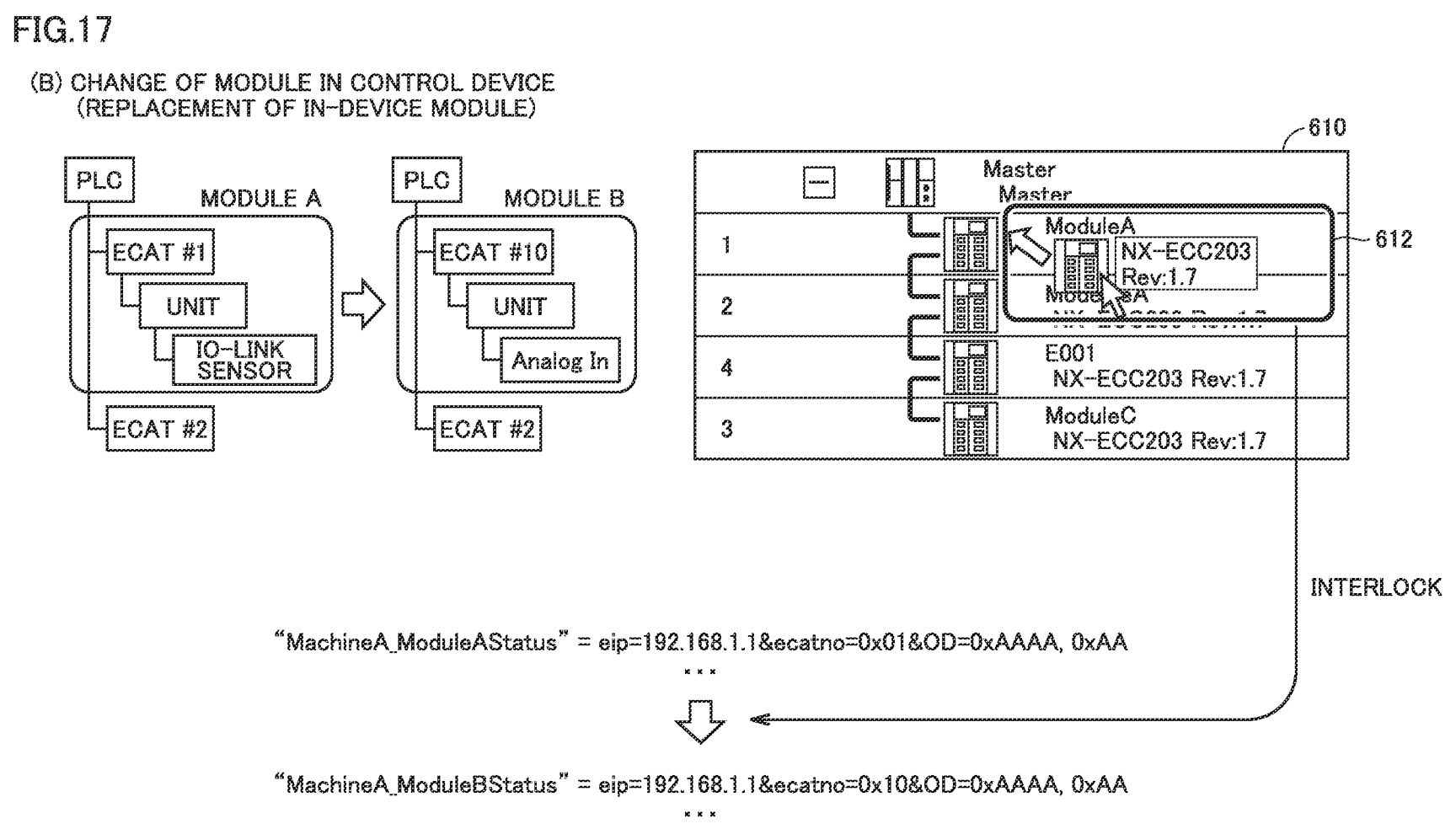

(B) CHANGE OF MODULE IN CONTROL DEVICE
(REPLACEMENT OF IN-DEVICE MODULE)

PLC

MODULE A

ECAT #1

UNIT

IO-LINK SENSOR

ECAT #2

PLC

MODULE B

ECAT #10

UNIT

Analog In

ECAT #2

610

612

Master

Master

1 ModuleA NX-ECC203 Rev:1.7

2

4 E001 NX-ECC203 Rev:1.7

3 ModuleC NX-ECC203 Rev:1.7

INTERLOCK

"MachineA_ModuleAStatus" = eip=192.168.1.1&ecatno=0x01&OD=0xAAAA, 0xAA

...

"MachineA_ModuleBStatus" = eip=192.168.1.1&ecatno=0x10&OD=0xAAAA, 0xAA

...

CONTROL SYSTEM, DATA PROVIDING METHOD, AND RELAY PROCESSING PROGRAM

CROSS REFERENCE TO RELATED APPLICATIONS

This application is a National Stage of International Application No. PCT/JP2022/012246 filed Mar. 17, 2022, claiming priority based on Japanese Patent Application No. 2021-075642 filed Apr. 28, 2021, the contents of each of which being herein incorporated by reference in their entireties.

TECHNICAL FIELD

The present invention relates to a control system, a data providing method, and a relay processing program.

BACKGROUND ART

With advances in information and communication technology (ICT), attention to Internet of Things (IOT), and the like in recent years, there are increasing needs to acquire field-level data controlled by a control device.

To meet such needs, for example, Japanese Patent Laying-Open No. 2020-13223 (PTL 1) discloses a configuration capable of collecting various information of any device in a control system by a general-purpose interface. In addition, Japanese Patent Laying-Open No. 2020-13224 (PTL 2) discloses a configuration capable of efficiently collecting various information of any device in a control system in response to a state change in the control system.

CITATION LIST

Patent Literature

PTL 1: Japanese Patent Laying-Open No. 2020-13223
PTL 2: Japanese Patent Laying-Open No. 2020-13224

SUMMARY OF INVENTION

Technical Problem

As compared with the above-described prior arts, there is provided a control system and the like that can acquire necessary data more easily and can take measures more flexibly even when a system configuration of an acquisition target is changed.

Solution to Problem

According to an embodiment of the present invention, a control system including one or more control devices is provided. The control system includes: a processing unit configured to determine processing for the one or more control devices or a device connected to the one or more control devices in accordance with an access request; a providing unit configured to transmit data acquired by performing the determined processing to a transmission source of the access request; a storage unit configured to store a character string definition including at least one combination of a first character string and a second character string longer than the first character string; and an interpretation unit configured to refer to the character string definition and configured to replace the first character string included in the access request with the second character string associated with the first character string.

With this configuration, when the access request is described using the first character string instead of an original second character string, the interpretation unit replaces the access request with the original second character string. As a result, it is possible to reduce time and effort to generate an access request and to make it easy to acquire necessary data, and at the same time, even when a system configuration of an acquisition target is changed, it is possible to flexibly cope with the change by appropriately updating a content of the character string definition.

The interpretation unit may interpret, as the first character string, a character string concatenated with a specific character string included in the access request. With this configuration, the first character string is replaced with the second character string only when the first character string is concatenated with the specific character string. Therefore, it is possible to avoid a situation where a character string included in the access request is unintentionally replaced.

The access request may include an access path representing a path for accessing the control device included in the control system or the device. With this configuration, the path to the target control device or device can be clearly specified using the access request.

The access request may include a conversion command that specifies conversion processing on the data acquired from the control device included in the control system or the device. With this configuration, the specified conversion processing is performed on the data acquired from the control device or the device, and a result of the specified processing is provided; therefore, it is possible to simplify processing after the transmission source receives the data.

The control system may further include a generation unit configured to search for the control device included in the control system and for the device and to generate a combination of a first character string and a second character string. With this configuration, it is possible to make it easy to generate an access request for acquiring data from any control device and device included in the control system.

The generation unit may be configured to generate a combination of a first character string and a second character string that meets a predetermined condition. With this configuration, when a condition is set in accordance with a specific condition, a combination of a first character string and a second character string that meets the specific condition is generated. Therefore, it is possible to make it easy to generate an access request for acquiring data and to suppress generation of an unnecessary combination of a first character string and a second character string.

The control system may further include a registration unit configured to register, in the character string definition, only any combination selected from among combinations of a first character string and a second character string that are generated by the generation unit. With this configuration, only a combination of a first character string and a second character string in accordance with a specific purpose can be registered; therefore, resources such as a recording area can be efficiently used.

The control system may further include an update unit configured to update, in accordance with a change in a configuration in the control system, a content of the combination of the first character string and the second character string included in the character string definition. With this configuration, the content of the combination of the first character string and the second character string is updated in accordance with the change in the configuration in the control system; therefore, also in the control system whose configuration has been changed, it is possible to continuously use the same access request as the access request before the change.

According to another embodiment of the present invention, there is provided a data providing method in a control system including one or more control devices. The data providing method includes: referring to a character string definition including at least one combination of a first character string and a second character string longer than the first character string, and replacing the first character string included in an access request with a second character string associated with the first character string; determining processing for the one or more control devices or a device connected to the one or more control devices in accordance with the access request; and transmitting data acquired by performing the determined processing to a transmission source of the access request.

According to still another embodiment of the present invention, there is provided a relay processing program for providing data to be executed by a computer associated with a control system including one or more control devices. The relay processing program causes the computer to execute a method including: referring to a character string definition including at least one combination of a first character string and a second character string longer than the first character string, and replacing the first character string included in an access request with a second character string associated with the first character string; determining processing for the one or more control devices or a device connected to the one or more control devices in accordance with the access request; and transmitting data acquired by performing the determined processing to a transmission source of the access request.

Advantageous Effects of Invention

With the present invention, as compared with the above-described prior art, there is provided a control system and the like that can acquire necessary data more easily and can take more flexible measures when a system configuration of an acquisition target is changed.

BRIEF DESCRIPTION OF DRAWINGS

FIG. 6 is a schematic diagram illustrating an example of an alias definition stored in the relay device of the control system according to the present embodiment.

FIG. 7 is a diagram illustrating an example of a conversion command processed by the relay device of the control system according to the present embodiment.

FIG. 9(A) illustrates an example of a query to access data and FIG. 9(B) illustrates an example of an alias definition.

FIG. 10 is a flowchart illustrating a processing procedure related to management of an alias in the control system according to the present embodiment, where FIG. 10(A) illustrates a processing procedure to register an alias in alias definition, FIG. 10(B) illustrates a processing procedure of deletion processing of an alias from alias definition, and FIG. 10(C) illustrates a processing procedure of initialization processing of alias definition.

FIG. 11 is a flowchart illustrating a processing procedure of a query in the control system according to the present embodiment.

FIG. 12 is a flowchart illustrating a processing procedure related to automatic generation of an alias in the control system according to the present embodiment.

FIG. 14 is a flowchart illustrating a processing procedure related to selection and registration of aliases in the control system according to the present embodiment.

FIG. 15 is a schematic diagram illustrating an example of updating aliases in the control system according to the present embodiment, where FIG. 15(A) illustrates an example in which a network configuration including network addresses is changed, and FIG. 15(B) illustrates an example in which a module in the control device is changed.

FIG. 17 is a schematic diagram illustrating an example of processing of updating aliases in accordance with a change of a module in the control device of the control system according to the present embodiment.

DESCRIPTION OF EMBODIMENTS

Figure 1:
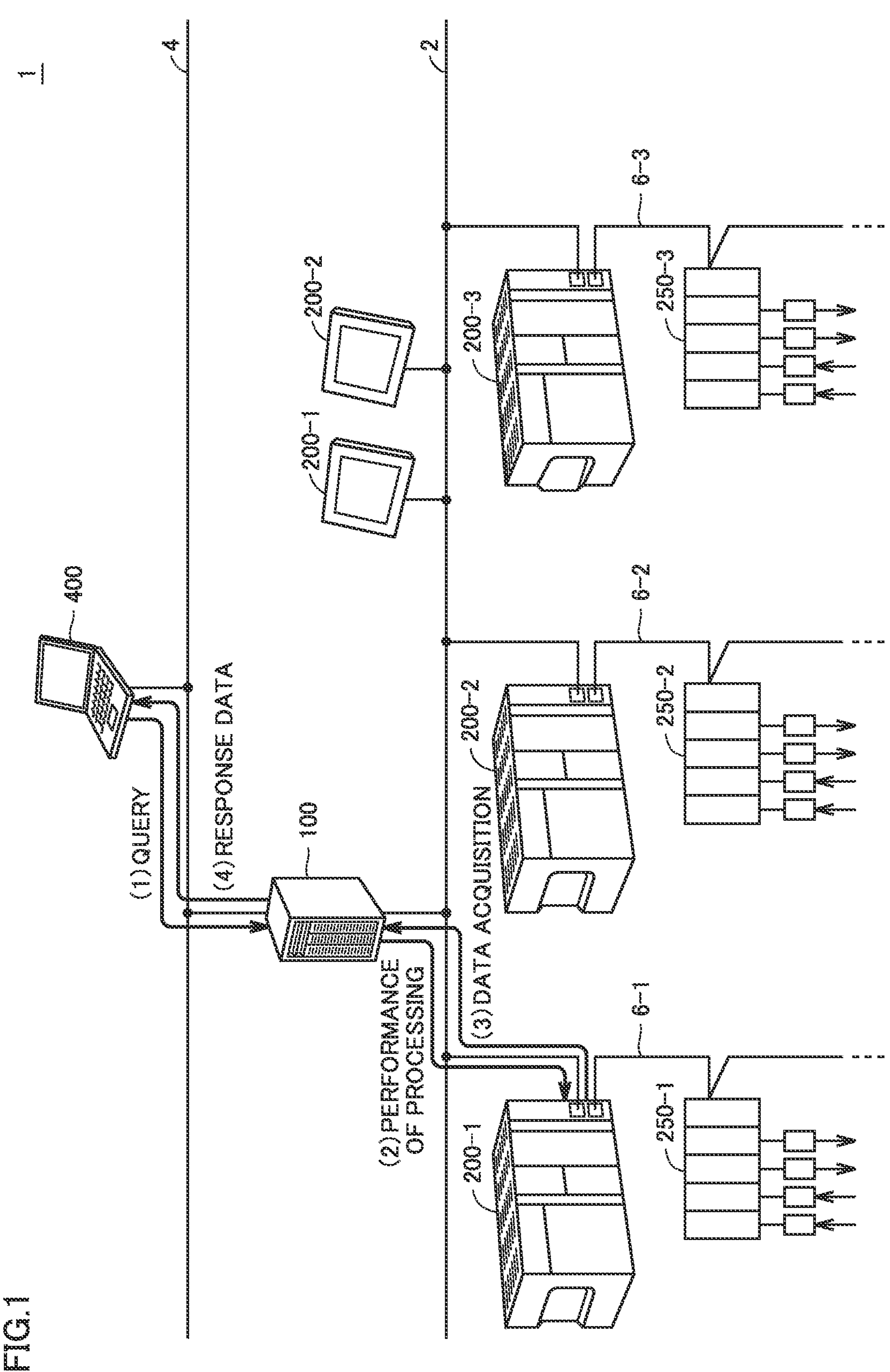
FIG. 1 is a schematic diagram illustrating an overall configuration example of a control system according to a present embodiment.

Hereinafter, an embodiment of the present invention will be described in detail with reference to the drawings. In the drawings, the same or corresponding part is denoted by the same reference sign, and the description thereof will not be repeated.

A. Application Example

First, an example of a scene to which the present invention is applied will be described.

FIG. 1 is a schematic diagram illustrating an overall configuration example of a control system 1 according to the present embodiment. With reference to FIG. 1, control system 1 according to the present embodiment includes, as configuration elements: a relay device 100; and one or more control devices 200-1, 200-2, 200-3, . . . (hereinafter, also collectively referred to as "control devices 200").

In response to an access request (hereinafter, also referred to as "query") to data that is held, managed, or generated by one or more control devices 200, relay device 100 acquires the required data and responds to the access request.

One or more control devices 200 control a control target such as equipment or a machine. Control device 200 may be embodied as a kind of computer such as a programmable logic controller (PLC).

In control system 1 illustrated in FIG. 1, relay device 100 and control devices 200-1, 200-2, and 200-3 are communicably connected to each other via a network 2. Control devices 200-1, 200-2, and 200-3 are respectively connected to the devices 250-1, 250-2, and 250-3 (hereinafter, also collectively referred to as "devices 250") via the field networks 6-1, 6-2, and 6-3 (hereinafter, also collectively referred to as "field networks 6").

In the present specification, the "device" includes any device that holds, manages, or generates various data. The "device" may include, for example, individual sensors and a control device that performs control computation. In the following, for convenience of description, control device 200 is distinguished from device 250, but the term "device" can include control device 200 and device 250.

FIG. 1 illustrates remote input/output (I/O) devices as an example of devices 250. The remote I/O devices each typically include a communication unit that performs communication via field network 6 and an input and output unit to perform acquiring of input data and outputting of output data, and exchanges an input signal (input data) and an output signal (output data) with a control target such as equipment and a machine.

Device 250 is not limited to a remote I/O device, and may include any device such as various sensors and a servo driver. In addition, FIG. 1 illustrates a configuration example in which one device 250 is connected to field network 6, but the present invention is not limited to such configuration, and a plurality of devices 250 may be connected to field network 6.

As field network 6, for example, it is preferable to employ an industrial communication protocol such as EtherCAT (registered trademark), EtherNet/IP (registered trademark), DeviceNet (registered trademark), CompoNet (registered trademark), or the like.

Control system 1 may further include one or more display devices 300. Display device 300 is also referred to as a human machine interface (HMI) or the like. In response to an operation from a user, display device 300 transmits, to control device 200, a command or the like corresponding to the user operation, and display device 300 graphically displays data or the like acquired from control device 200.

Relay device 100 is connected to a network 4 in addition to network 2. An information processing device 400 connected to network 4 transmits a query to relay device 100.

In the configuration example illustrated in FIG. 1, network 2 corresponds to a so-called operational technology (OT) network, and network 4 corresponds to a so-called information technology (IT) network.

Information processing device 400 is typically a general-purpose computer. For example, information processing device 400 transmits to relay device 100 a query from a general-purpose application such as a browser, and acquires, from relay device 100, data that is held, managed, or generated by control device 200.

Processing performed by relay device 100 is summarized as follows. First, when receiving a query from any transmission source ((1) query), relay device 100 acquires data by performing processing specified by the query ((2) performance of processing and (3) data acquisition). Then, relay device 100 transmits response data including the acquired data to the transmission source of the query ((4) response data).

In this manner, relay device 100 provides data that is held, managed, or generated by control system 1, in response to any query.

Figure 2:
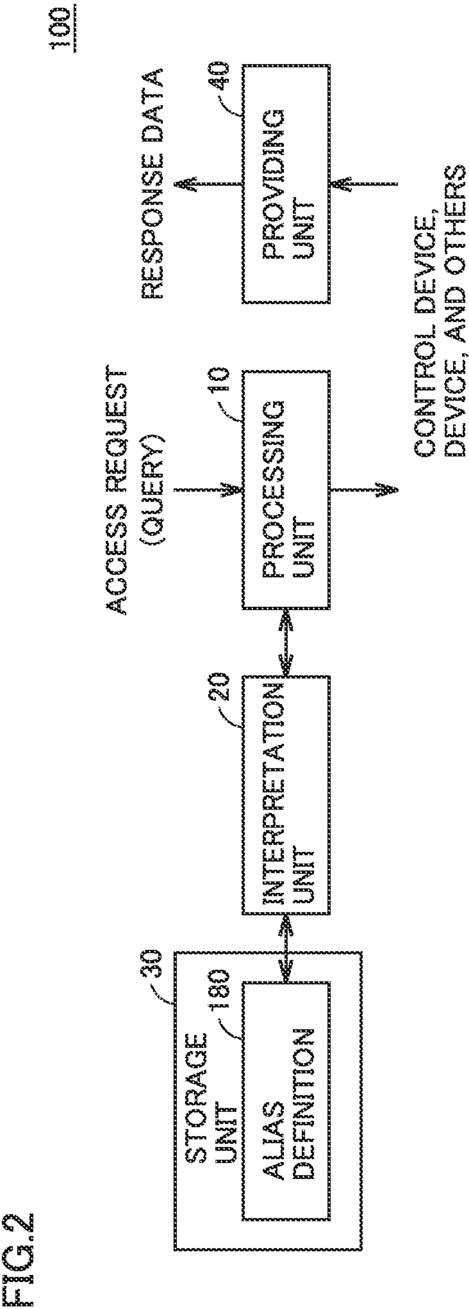
FIG. 2 is a schematic diagram illustrating a main part of a functional configuration of a relay device of the control system according to the present embodiment.

FIG. 2 is a schematic diagram illustrating a main part of a functional configuration of relay device 100 of control system 1 according to the present embodiment. With reference to FIG. 2, relay device 100 includes, as main functional configurations, a processing unit 10, an interpretation unit 20, a storage unit 30, and a providing unit 40.

Processing unit 10 determines processing for control device 200 or device 250 connected to control device 200 in accordance with an access request (query) from outside. Providing unit 40 transmits data acquired by performing the determined processing to a transmission source of the access request (query).

In control system 1 according to the present embodiment, relay device 100 can perform various types of processing for any control device 200 and device 250 included in control system 1, in accordance with the query.

Examples of the processing performed by relay device 100 typically include processing of acquiring all or part of data held or managed by control device 200 or device 250.

Examples of another processing performed by relay device 100 include processing of changing an operation or behavior of control device 200 or device 250. Examples of the processing of changing the operation and behavior include the following processing.

- Switching of control mode (run mode, program mode, debug mode)
- Shutdown
- Reboot
- Start and stop of task and service
- New creation, start, stop, and deletion of data trace
- New creation, start, stop, and deletion of alarm With respect to the processing of changing the operation and behavior of control device 200 or device 250, it is possible to acquire, as a return value, data including an execution result of the processing and the like, for example.

As described above, in the present specification, the "processing for control device 200 or device 250 connected to control device 200" includes any processing that can be performed by relay device 100 for any control device 200 or device 250. Furthermore, the "data acquired by performing the determined processing" includes various data acquired by performing processing for target control device 200 or device 250.

In the following, for convenience of description, processing of acquiring data held or managed by control device 200 or device 250 will be mainly described.

In control system 1 according to the present embodiment, it is possible to use, as substitute for at least a part of a character string included in a query, another character string that is made shorter than the "at least a part of a character string included in a query". For that purpose, storage unit 30 stores an alias definition 180 as a character string definition including at least one combination of a first character string and a second character string longer than the first character string.

Alias definition 180 includes at least one combination of (i) a character string (, which corresponds to the first character string and is also referred to as "alias name" below,) that can be used as at least a part of a query, and (ii) a character string (, which corresponds to the second character string,) that is longer than the first character string (, which is the alias name). A specific example of alias definition 180 will be described later.

In the present specification, the term "alias" includes both (i) only a character string (that is, an alias name) usable as at least a part of a query and (ii) a combination of a character string usable as at least a part of the query and a character string that represents a real body of the "character string usable as at least a part of the query" and is longer than the "character string usable as at least a part of the query". Note that the "alias" usable in control system 1 according to the exemplary embodiment may be referred to as "shortcut" or "shortened expression". That is, the "alias" includes the meaning as described above regardless of the name.

Interpretation unit 20 refers to the character string definition (alias definition 180) stored in storage unit 30 and replaces the first character string included in an access request with the second character string associated with the first character string. Interpretation unit 20 replaces the first character string included in the access request with the second character string associated with the first character string, and processing unit 10 determines an access target on the basis of the replaced access request. Therefore, an access request can be generated even when the access path to the access target is unknown, and it is also possible to conceal the specific access path. Furthermore, even in a case where the configuration of control system 1 or the like has changed, it is possible to cope with the configuration after the change only by updating an association relationship (alias definition 180) between the first character string and the second character string. Therefore, it is not necessary to correct or change the access request itself.

B. Hardware Configuration Example

Next, a hardware configuration example of the devices constituting control system 1 according to the present embodiment will be described.

(b1: Relay Device 100)

Figure 3:
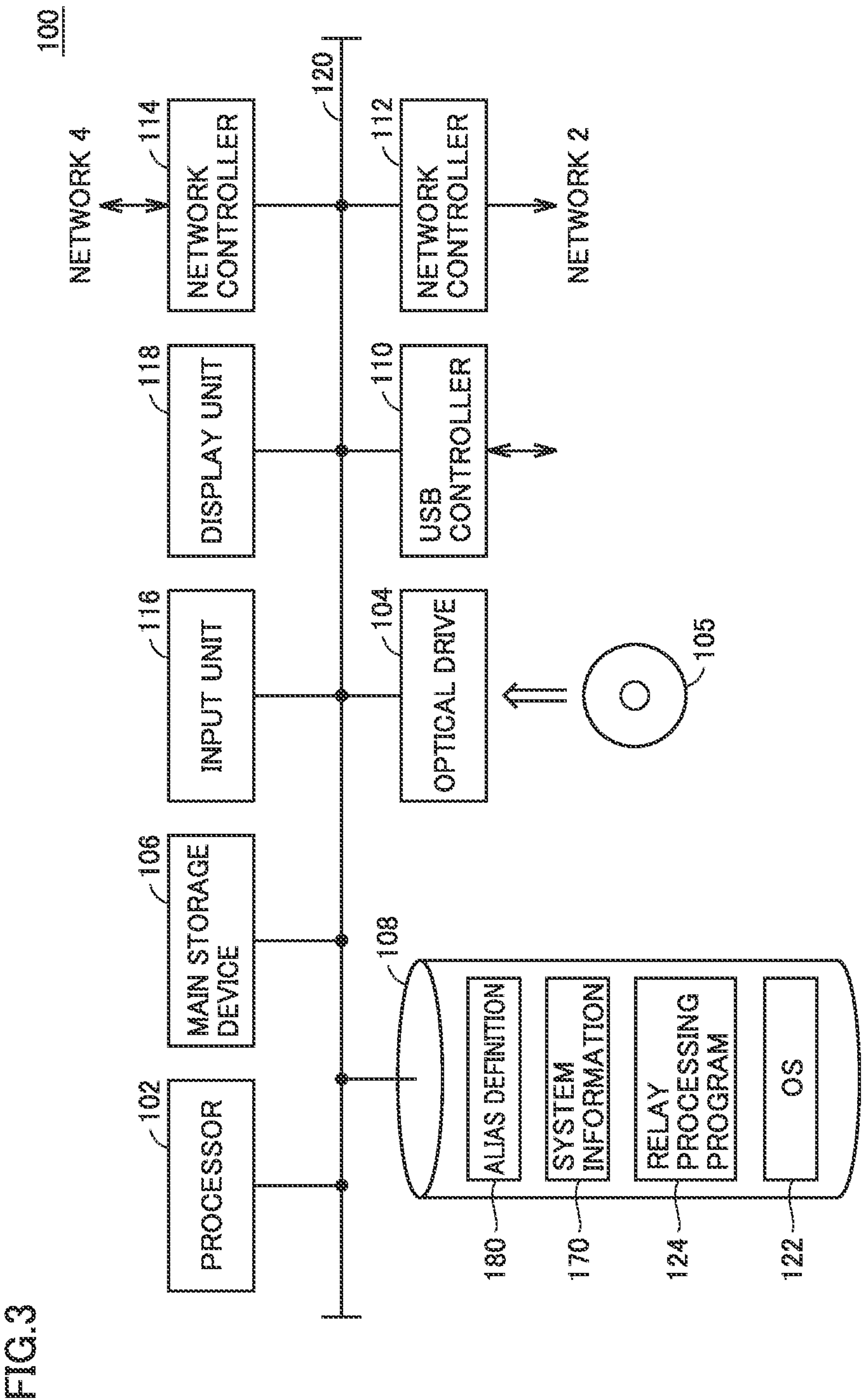
FIG. 3 is a block diagram illustrating a hardware configuration example of a relay device of the control system according to the present embodiment.

FIG. 3 is a block diagram illustrating a hardware configuration example of relay device 100 of control system 1 according to the present embodiment. With reference to FIG. 3, relay device 100 is an example of a computer, and includes one or more processors 102, an optical drive 104, a main storage device 106, a secondary storage device 108, a universal serial bus (USB) controller 110, network controllers 112 and 114, an input unit 116, and a display unit 118. These components are connected via a bus 120.

Processor 102 is configured with, for example, a central processing unit (CPU), a micro-processing unit (MPU), a graphics processing unit (GPU), or the like, and reads various programs stored in secondary storage device 108, develops the programs in main storage device 106, and executes the programs, thereby implementing various types of processing as described later.

Secondary storage device 108 corresponds to storage unit 30 illustrated in FIG. 2 and is configured with, for example, a hard disk drive (HDD), a flash solid state drive (SSD), or the like. Secondary storage device 108 typically stores an OS 122 and a relay processing program 124 for implementing processing to be described later. Note that secondary storage device 108 may store a necessary program other than relay processing program 124 illustrated in FIG. 3. Furthermore, secondary storage device 108 stores system information 170 and alias definition 180 (details will be described later).

Relay device 100 includes optical drive 104. From a recording medium 105 (for example, an optical recording medium such as a digital versatile disc [DVD]) that non-transiently stores a computer-readable code, the computer-readable code stored therein is read, and the computer-readable code is installed in secondary storage device 108 or the like.

Various programs executed by relay device 100 may be installed via computer-readable recording medium 105, but may be installed by being downloaded from any server device on a network. Furthermore, in some cases, a function provided by relay device 100 according to the present embodiment may be implemented by using a part of a software module provided by OS 122.

USB controller 110 is in charge of exchanging data with another information processing device via USB connection. Network controller 112 is in charge of exchanging data with control device 200 and the like via network 2. Network controller 114 is in charge of exchanging data with information processing device 400 and the like via network 4.

Input unit 116 is configured with a keyboard, a mouse, and the like, and receives a user operation. Display unit 118 is configured with a display, various indicators, a printer, and the like, and outputs a processing result and the like from processor 102.

FIG. 3 illustrates a configuration example in which necessary functions are provided by processor 102 executing programs; however, some or all of these provided functions may be implemented by using a dedicated hardware circuit (for example, an application specific integrated circuit [ASIC], a field-programmable gate array [FPGA], or the like).

(b2: Control Device 200)

Figure 4:
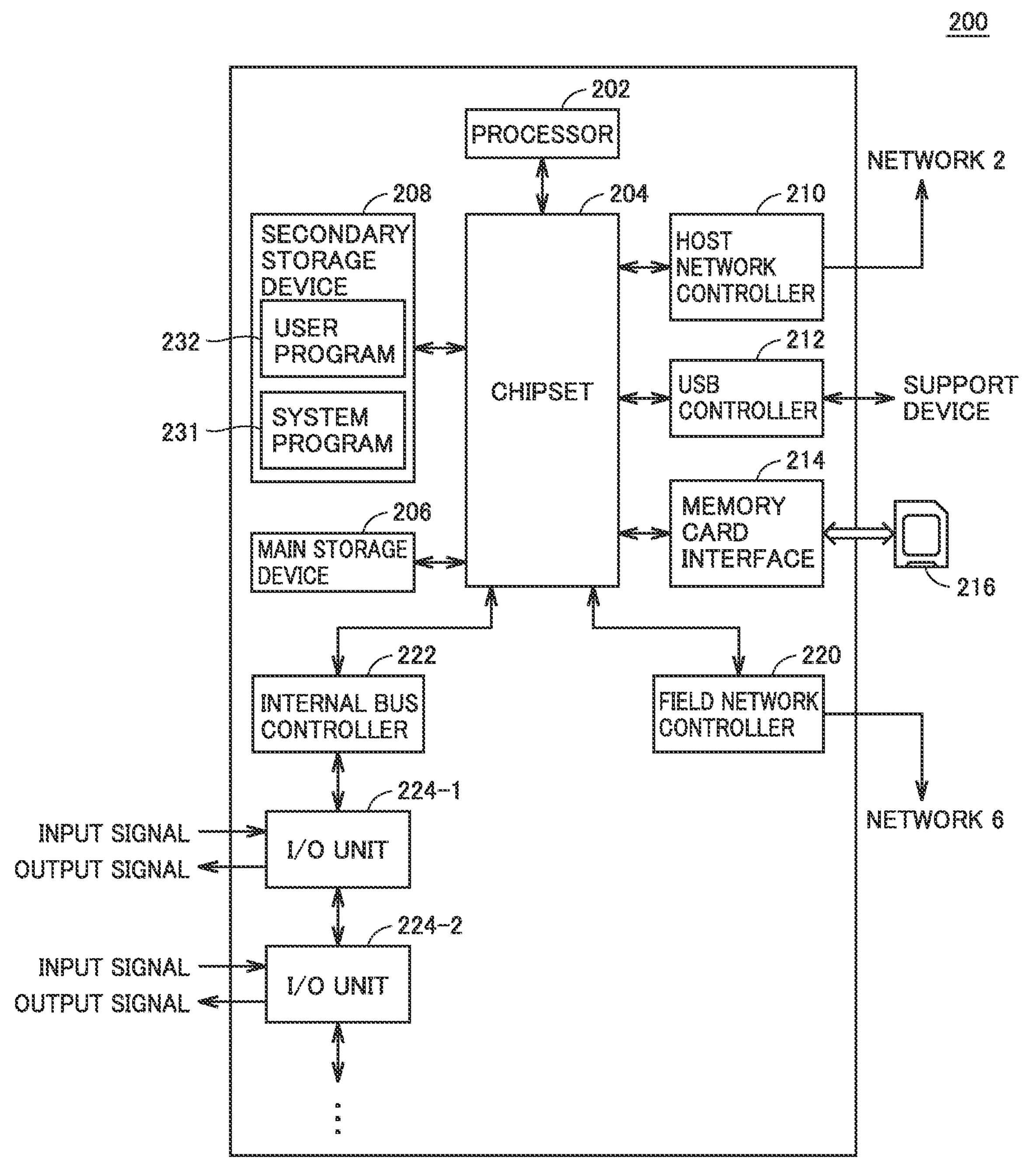
FIG. 4 is a block diagram illustrating a hardware configuration example of a control device of the control system according to the present embodiment.

FIG. 4 is a block diagram illustrating a hardware configuration example of control device 200 of control system 1 according to the present embodiment. With reference to FIG. 4, control device 200 is an example of a computer, and includes a processor 202, a chipset 204, a main storage device 206, a secondary storage device 208, a host network controller 210, a USB controller 212, a memory card interface 214, a field network controller 220, an internal bus controller 222, and I/O units 224-1, 224-2, . . . .

Processor 202 is configured with, for example, a CPU, an MPU, a GPU, or the like, and reads various programs stored in secondary storage device 108, develops the programs in main storage device 206, and executes the programs, thereby implementing an environment for performing control computation. Chipset 204 controls data transmission and the like between processor 202 and each component.

Secondary storage device 208 stores a user program 232 in which commands related to the control computation are described, in addition to a system program 231 for implementing an environment for performing the control computation.

Host network controller 210 is in charge of exchanging data with relay device 100 and the like via network 2. USB controller 212 is in charge of exchanging data with a support device (not illustrated) or the like via USB connection.

Memory card interface 214 is configured such that a memory card 216 is detachable, and memory card interface 214 can write data in memory card 216 and read various data (such as a user program and trace data) from memory card 216.

Internal bus controller 222 is an interface that exchanges data with I/O units 224-1, 224-2, . . . mounted on control devices 200.

Field network controller 220 is in charge of exchanging data with device 250 and the like via field network 6.

FIG. 4 illustrates the configuration example in which necessary functions are provided by processor 202 executing programs; however, some or all of these provided functions may be implemented by using a dedicated hardware circuit (for example, ASIC, FPGA, or the like).

(b3: Display Device 300)

Display device 300 of control system 1 according to the present embodiment is typically implemented by using hardware (for example, a general-purpose personal computer) according to a general-purpose architecture. A hardware configuration example of display device 300 is known; therefore, a detailed description will not be given.

(b4: Information Processing Device 400)

Information processing device 400 of control system 1 according to the present embodiment is typically implemented by using hardware (for example, a general-purpose personal computer) according to a general-purpose architecture. A hardware configuration example of information processing device 400 is known; therefore, a detailed description will not be given.

C. Functional Configuration of Relay Device 100

Next, an example of a functional configuration of relay device 100 of control system 1 according to the present embodiment will be described.

Figure 5:
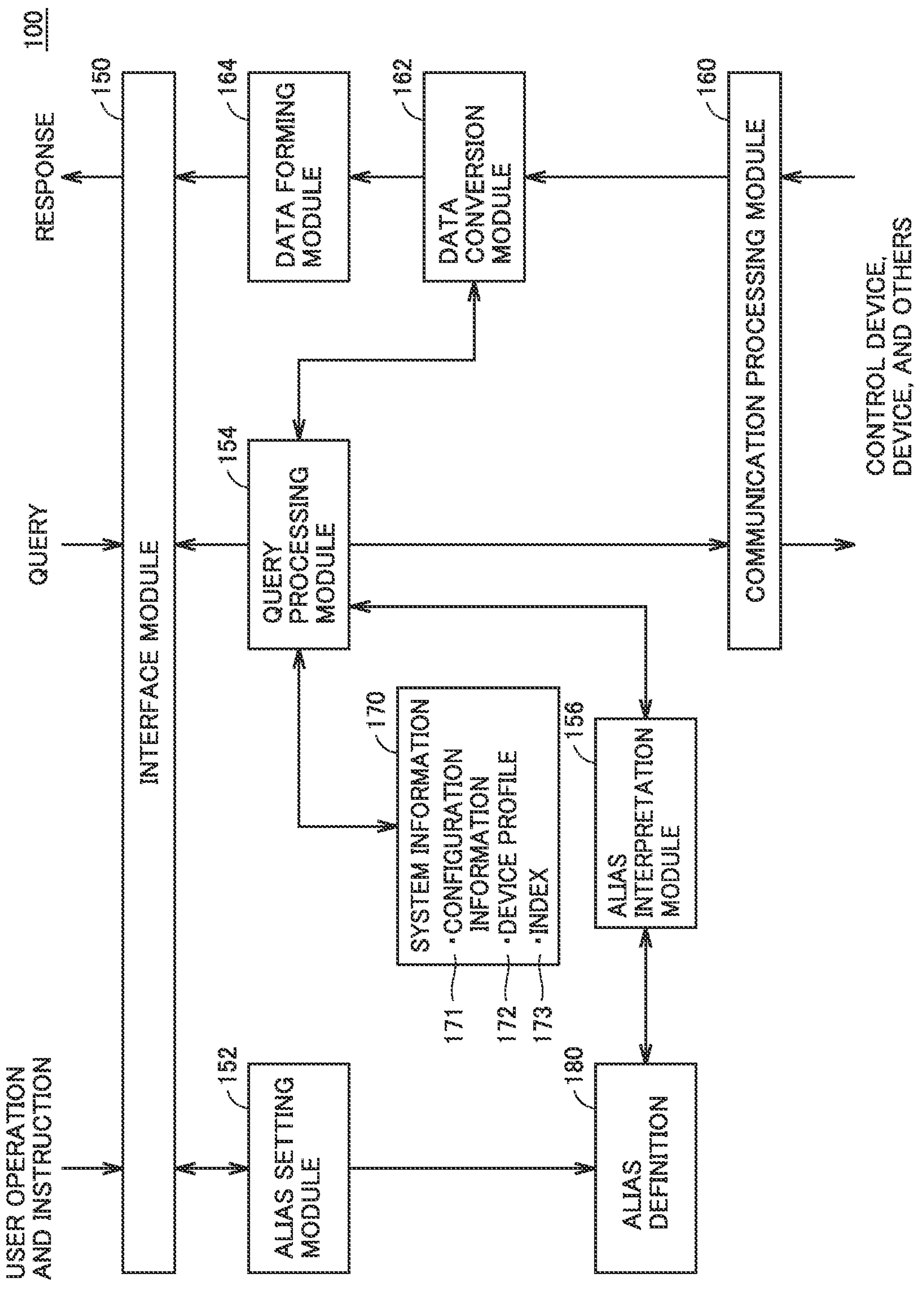
FIG. 5 is a block diagram illustrating a functional configuration example of a relay device of the control system according to the present embodiment.

FIG. 5 is a block diagram illustrating a functional configuration example of relay device 100 of control system 1 according to the present embodiment. Functions illustrated in FIG. 5 are typically implemented by processor 102 of relay device 100 executing relay processing program 124.

With reference to FIG. 5, relay device 100 includes, as a main functional configuration, an interface module 150, an alias setting module 152, a query processing module 154, an alias interpretation module 156, a data conversion module 162, and a data forming module 164. Furthermore, relay device 100 stores system information 170 and alias definition 180.

Interface module 150 receives a query from information processing device 400 or the like, and transmits response data to information processing device 400. In addition, interface module 150 receives various operations and instructions from a user.

Query processing module 154 corresponds to processing unit 10 illustrated in FIG. 2, and determines processing for control device 200 or device 250 connected to control device 200 in accordance with an access request (query). More specifically, query processing module 154 interprets the input query, and notifies communication processing module 160 of the access path specified by the query. More specifically, query processing module 154 refers to system information 170, and determines the access path on the basis of the character string associated with the alias from alias interpretation module 156.

Alias interpretation module 156 corresponds to interpretation unit 20 illustrated in FIG. 2, and refers to alias definition 180, thereby replacing the alias (first character string) included in the access request with the character string (second character string associated with the alias. That is, alias interpretation module 156 outputs the character string associated with the specified alias included in the access request.

Communication processing module 160, data conversion module 162, and data forming module 164 correspond to providing unit 40 illustrated in FIG. 2, and transmit data acquired by performing the determined processing to the transmission source of the access request.

More specifically, communication processing module 160 accesses a device specified by the access path and acquires specified data from the access destination device.

Data conversion module 162 converts or processes the data acquired from a target device in accordance with the conversion command included in the query. More specifically, data conversion module 162 performs processing such as numerical value conversion, unit conversion, range conversion, and format conversion.

Data forming module 164 forms the obtained data in a specified output format. Examples of the data format include a JSON format, an HTML format, an XML format, a CSV format, a text format, and a binary format. However, when the data format is not specified, conversion to a predetermined data format may be performed.

Alias setting module 152 performs setting, registration, change, deletion, and the like of an alias in accordance with an operation and instruction of a user. Furthermore, alias setting module 152 may perform processing such as automatic generation of alias as described later.

System information 170 includes, for example, configuration information 171, a device profile 172, and an index 173.

Configuration information 171 includes information representing a connection relationship between devices included in control system 1. Specifically, configuration information 171 includes information defining a network topology, address information of each device, a communication protocol of each network, and the like. Configuration information 171 may include information related to a physical or virtual network topology or a unit configuration (address, format, communication band, and the like). Configuration information 171 may be statically set in advance, or may dynamically change in accordance with a change in the network configuration.

Device profile 172 includes information representing characteristics of each device. Specifically, device profile 172 includes a memory map in the device, object specifications, type information, obtainable data (attribute), scaling, and the like.

Index 173 is information used to efficiently access a device, and includes information indicating a state value of each device included in control system 1. Specifically, index 173 includes attribute values and individual identification numbers (such as serial numbers and MAC addresses) of the devices. Index 173 is typically generated dynamically, but it is possible to employ an index that is statically generated in advance. Note that index 173 is information used for speeding up access and is not necessarily required, and may be implemented depending on a situation.

Alias definition 180 defines a relationship between an alias and a character string associated with the alias. Basically, alias definition 180 is used to determine a character string that is associated with an alias included in a query.

FIG. 6 is a schematic diagram illustrating an example of alias definition 180 stored in relay device 100 of control system 1 according to the present embodiment. With reference to FIG. 6, alias definition 180 includes character strings 184 associated with alias names 182.

Alias name 182 is an expression obtained by shortening any character string 184. Character string 184 can include a conversion command representing the access path to an access destination and/or data conversion processing.

The number of the alias names 182 registered in alias definition 180 is not limited, and any alias name 182 can be registered. In addition, any alias name 182 can be employed as long as alias name 182 is not the same character string.

Furthermore, relay device 100 interprets a specific character string included in the query as a conversion command, and executes conversion processing in accordance with to the conversion command.

FIG. 7 is a diagram illustrating an example of the conversion command processed by relay device 100 of control system 1 according to the present embodiment. With reference to FIG. 7, the conversion command includes operation processing such as a numeric operation, a logical operation, a comparison operation, a bit operation, a significant digit operation, and a unit conversion. When a conversion command such as an operator, a character string, or a command for executing each operation is included in the query, relay device 100 executes conversion processing or operation processing specified in accordance with the conversion command included in the query.

As illustrated in FIG. 7, the query (access request) can include a conversion command that specifies conversion processing for data acquired from control device 200 or device 250 connected to control device 200.

Note that, in addition to a case where the conversion command is directly included in the query, the conversion command may be included in a character string obtained by interpreting the above-described alias. Furthermore, a query can be generated by combining the alias and the conversion command.

For example, in a case where the acquired value (distance whose variable name is Distance) is rounded off to two decimal places, 'ROUND ("Distance", 2)' may be included in the query as a conversion command.

Furthermore, in a case where the acquired value (temperature whose variable name is Temp) is converted from Fahrenheit to Celsius, 'CONVERT ("Temp", FAHRENHEIT, CELSIUS)' may be included in the query as a conversion command.

As described above, in control system 1 according to the present embodiment, any conversion processing, in addition to data acquisition, can be performed in accordance with the conversion command included in the query.

D. Query and Alias

Next, the query and the alias processed in control system 1 according to the present embodiment will be described.

In control system 1 according to the present embodiment, the query can be described in a format conforming to representational state transfer (REST) used for, for example, providing a web service and the like. Furthermore, the query may be described in a SQL language. However, any format can be used for the description of the query. Furthermore, in a case where a new format for describing a query becomes widely used, any new format can be employed.

On the other hand, the response data from relay device 100 may be described in JavaScript Object Notation (JSON) format or HyperText Markup Language (HTML) format.

Figure 8:
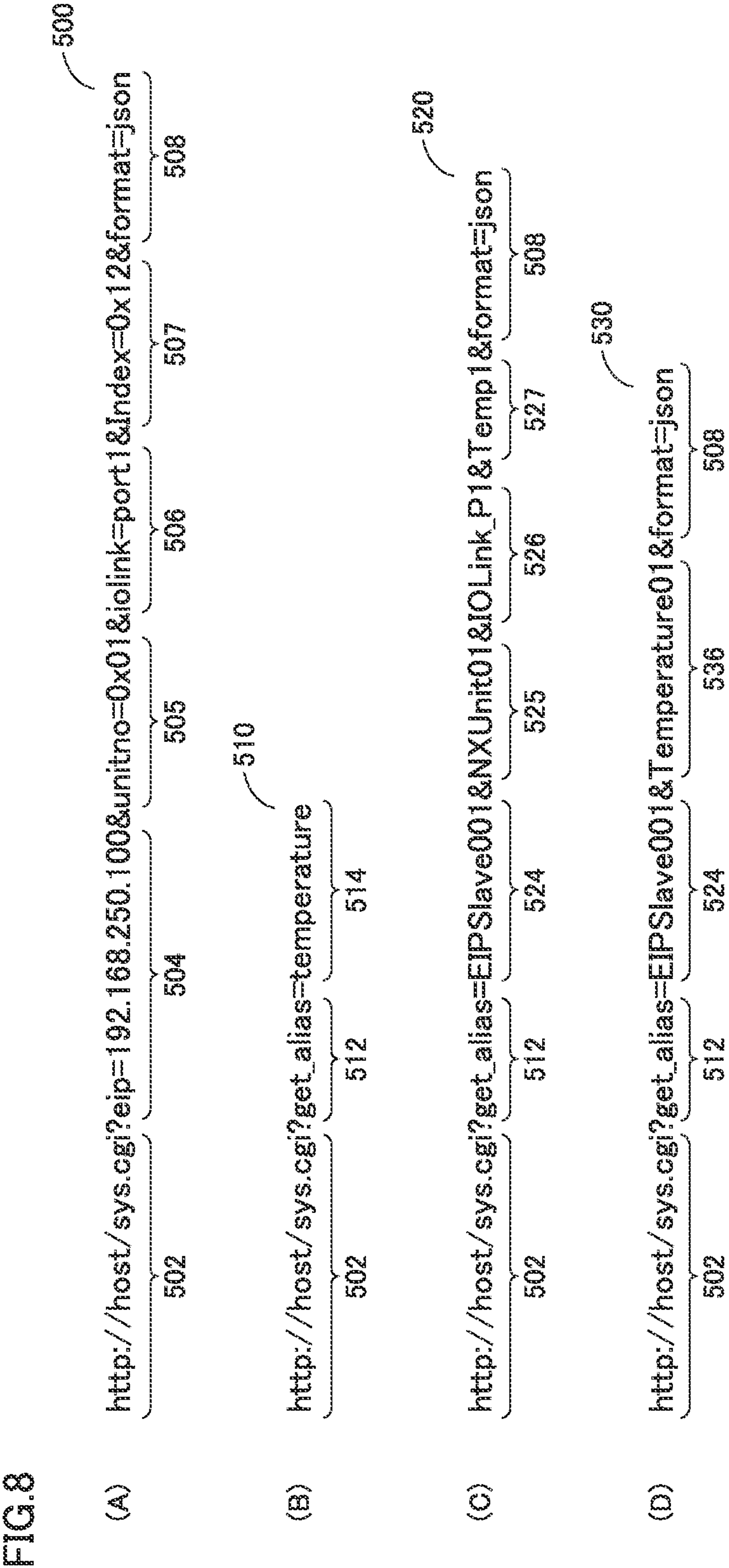
FIG. 8 is a diagram illustrating an example of a query used in the control system according to the present embodiment, where FIGS. 8(A), (B), (C), and (D) each illustrate an example of a query conforming to REST.

FIG. 8 is a diagram illustrating an example of the query used in control system 1 according to the present embodiment. FIG. 8 illustrates an example of a query conforming to REST. The query illustrated in FIG. 8 requests acquisition of input data (for example, a measured value of temperature) from a unit connected to control device 200 (or, a remote I/O device) included in control system 1 and further from a device (for example, a temperature sensor) connected via an IO-Link. Specifically, the query illustrated in FIG. 8 requests access to three layers including: control device 200 (or a remote I/O device) corresponding to the first layer; a unit corresponding to the second layer; and a device (for example, a temperature sensor) corresponding to the third layer.

With reference to FIG. 8(A), a query 500 includes an access destination description part 502 and query description parts 504, 505, 506, 507, and 508. Access destination description part 502 includes a scheme for specifying a communication protocol with relay device 100 and an authority for specifying relay device 100. Query description parts 504, 505, 506, 507, and 508 mean an access path for specifying a destination where data is acquired.

As illustrated in FIG. 8(A), the query (access request) may include the access path representing the path to access control device 200 or device 250 included in control system 1.

Query description part 504 describes an item "eip" that specifies control device 200 (or the remote I/O device) corresponding to the first layer. In the example illustrated in FIG. 8(A), the item is set to "192.168.250.100". That is, control device 200 (or the remote I/O device) whose network address is "192.168.250.100" is specified as the access target.

Query description part 505 describes an item "unitno" that specifies the unit corresponding to the second layer. In the example illustrated in FIG. 8(A), the item is set to "0×01". That is, the unit with the unit number "0×01" is specified as the access target.

Query description part 506 describes an item "iolink" that specifies an IO-Link for connection to the device corresponding to the third layer. In the example illustrated in FIG. 8(A), "port1" is set. That is, the IO-Link in which the master port number of the IO-Link is "port1" is specified as the access target.

Query description part 507 describes an item "Index" that specifies an index number of an IO-Link device for connection to the device corresponding to the third layer. In the example illustrated in FIG. 8(A), the item is set to "0×12". That is, a device having the index number "0×12" of the IO-Link device is specified as the access target.

Query description part 508 describes an item of "format" that specifies a format of response data of relay device 100 with respect to query 500. In the example illustrated in FIG. 8(A), the item is set to "json". That is, the format of the response data from relay device 100 is specified to be "JSON".

As illustrated in FIG. 8(A), the deeper the layer is, the longer the path to access the device and unit included in control system 1 is. Accordingly, it takes time and effort to generate the query. Therefore, in control system 1 according to the present embodiment, there can be used another character string in which at least a part of the character string included in a query is made shorter than the character string.

Relay device 100 interprets the alias included in the query into the character string associated with the alias and performs the specified processing.

FIG. 8(B) illustrates a query 510 in which query description parts 504, 505, 506, 507, and 508 included in query 500 illustrated in FIG. 8(A) are described by using an alias 514. In query 510 illustrated in FIG. 8(B), an alias 514 is described in addition to an item 512 of "get_alias" that indicates "to be interpreted as an alias". Relay device 100 processes alias 514 of "temperature" as meaning the description of query description parts 504, 505, 506, 507, and 508. As a result, the processing is performed in the same manner as in the case of query 500 illustrated in FIG. 8(A).

As described above, by using the alias, it is not necessary to describe the path to the data source as the access target, and the description of the query can be simplified. In addition, it is not necessary to disclose a specific access path, which is also advantageous in terms of security. That is, because the specific access path of control system 1 can be concealed, it is possible to reduce the risk of attack from a malicious third party.

Note that, as illustrated in FIG. 8(B), relay device 100 (alias interpretation module 156 illustrated in FIG. 5) may interpret, as alias 514, a character string concatenated with a specific character string (a keyword such as "get_alias", which is the item 512) included in the query (access request).

FIG. 8(B) illustrates an example in which whole of the access path included in query 500 is put into one alias, but an alias may be set for each any element included in the access path.

FIG. 8(*c*) illustrates a query 520 in which query description parts 504, 505, 506, 507, and 508 included in query 500 illustrated in FIG. 8(A) are described by using aliases 524, 525, 526, 527, and 528.

FIG. 8(D) illustrates a query 530 in which a query description part 504 included in query 500 illustrated in FIG. 8(A) is described by using an alias 524, and in addition, query description parts 505, 506, and 507 are described by using an alias 536.

For any of aliases 524, 525, 526, 527, 528, 534, and 536, a specific address or path is not described, but an abstracted character string is used. Therefore, even in a case where the configuration of control system 1 changes, as long as the query is described by using aliases, it is only necessary to update the association relationship between the aliases and the character string including access paths, and it is not necessary to update the query itself. Similarly, even if the target of the data to be acquired changes, it is only necessary to update the association relationship between the alias and the character string including the access path, and it is not necessary to change the query itself.

Figure 9:
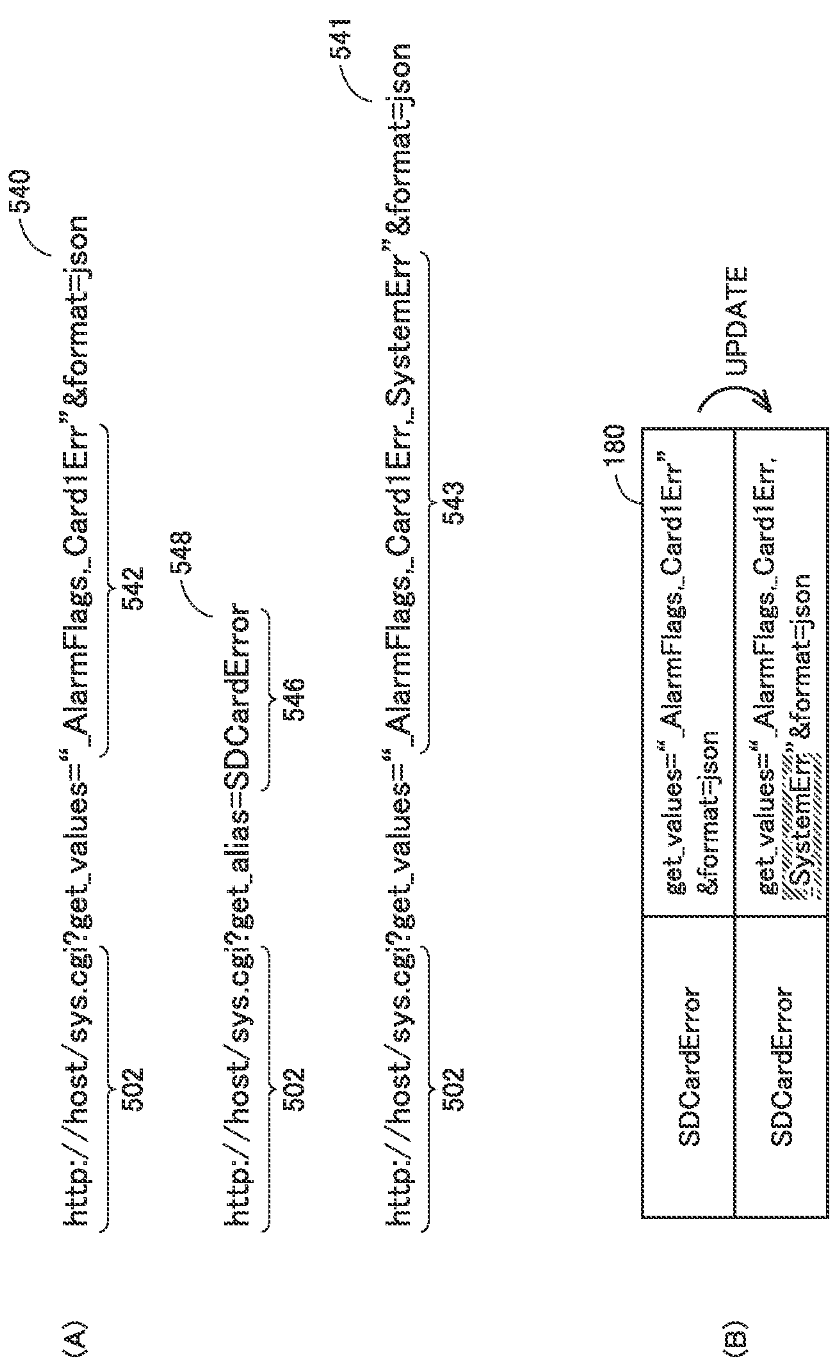
FIG. 9 is a diagram illustrating another example of a query used in the control system according to the present embodiment, where

FIG. 9 is a diagram illustrating another example of the query used in control system 1 according to the present embodiment. FIG. 9(A) illustrates an example of a query 540 to access data that is held, managed, or generated by control device 200. Query 540 includes a query description part 542 for acquiring an alarm flag held by control device 200 and an error of the memory card. Specifically, "AlarmFlags" and "Card1Err" included in query description part 542 respectively mean "alarm flag" and "memory card error".

In a query 548, a content of query 540 is described by using an alias 546. At this time, in alias definition 180 illustrated in FIG. 9(B), a description of 'get_values="_AlarmFlags,_Card1Err"&format=json' is associated with an alias 546 of "SDCardError".

In this state, it is assumed that there arises a need to acquire a system error in addition to the alarm flag and the error of the memory card. In this case, query 540 is changed like a query 541. Specifically, a query description part 543 includes "SystemErr" indicating a system error in addition to "AlarmFlags" and "Card1Err".

Even in a case where the query description part is changed, if the character string (including the access path) associated with the alias 546 in alias definition 180 is changed, the same alias 546 can be used as it is. That is, there is no need to change query 548 including alias 546.

More specifically, in alias definition 180 illustrated in FIG. 9(B), when the character string associated with the alias 546 of "SDCardError" is updated to be 'get_values="_AlarmFlags, Card1Err, SystemErr"&format=json', the acquisition target specified by the same alias 546 can be changed freely.

E. Processing Procedure Related to Alias

Next, a processing procedure related to the alias in control system 1 according to the present embodiment will be described.

FIG. 10 is a flowchart illustrating a processing procedure related to management of the alias in control system 1 according to the present embodiment. Each step illustrated in FIG. 10 is typically implemented by processor 102 of relay device 100 executing relay processing program 124.

FIG. 10(A) illustrates a processing procedure to register an alias in alias definition 180. With reference to FIG. 10(A), relay device 100 receives a new alias and a character string associated with the new alias (step S10). Then, relay device 100 determines if the received alias is already registered in alias definition 180 (step S12). If the received alias is not already registered in alias definition 180 (step S12: NO), relay device 100 determines if the character string associated with the alias conforms to a predetermined rule (step S14).

If the character string associated with the alias conforms to the predetermined rule (step S14: YES), relay device 100 registers the received alias and the associated character string in alias definition 180 (step S16). Then, relay device 100 responds that the registration of the alias has been normally completed (step S18). Then, the processing ends.

On the other hand, if the received alias is already registered in alias definition 180 (step S12: YES), or if the character string associated with the alias does not conform to the predetermined rule (step S14: NO), relay device 100 responds that the registration of the alias has ended with an error (step S20). Then, the processing ends.

FIG. 10(B) illustrates a processing procedure of deletion processing of an alias from alias definition 180. With reference to FIG. 10(B), relay device 100 receives an alias to be deleted (step S30). Then, relay device 100 determines if the received alias is already registered in alias definition 180 (step S32).

If the received alias is already registered in alias definition 180 (step S32: YES), relay device 100 deletes the entry associated with the received alias, from alias definition 180 (step S34). Then, relay device 100 responds that the deletion of the alias has been normally completed (step S36). Then, the processing ends.

On the other hand, if the received alias is not already registered in alias definition 180 (step S32: NO), relay device 100 responds that the deletion of the alias has ended with an error (step S38). Then, the processing ends.

FIG. 10(C) illustrates a processing procedure of initialization processing of alias definition 180. With reference to FIG. 10(C), relay device 100 receives an initialization instruction to initialize alias definition 180 (step S40). Then, relay device 100 deletes all the entries of the target alias definition 180 in accordance with the received initialization instruction (step S42). Then, relay device 100 responds that the initialization of the alias has been normally completed (step S44). Then, the processing ends.

FIG. 11 is a flowchart illustrating a processing procedure of a query in control system 1 according to the present embodiment. Each step illustrated in FIG. 11 is typically implemented by processor 102 of relay device 100 executing relay processing program 124.

With reference to FIG. 11, relay device 100 receives a query from information processing device 400 or the like (step S50). Then, relay device 100 determines if an alias is included in the received query (step S52).

If an alias is included in the received query (step S52: YES), relay device 100 refers to alias definition 180 to determine if the alias included in the query is registered (step S54).

If the alias included in the query is not registered (step S54: NO), relay device 100 responds that the processing has ended with an error (step S56). Then, the processing ends.

If the alias included in the query is registered (step S54: YES), relay device 100 refers to alias definition 180 to acquire the character string associated with the alias (step S58), and replaces the alias included in the received query with the acquired character string (step S60).

As described above, relay device 100 refers to alias definition 180 including at least one combination of an alias name and a character string, and performs a process of replacing the alias name included in the access request with the character string associated with the alias name (steps S50 to S60).

If the received query does not include an alias (step S52: NO) or when step S60 has been performed, relay device 100 accesses a device specified by the access path included in the query (step S62). As described above, relay device 100 determines processing for control device 200 or device 250 connected to control device 200 in accordance with the access request from outside.

Then, relay device 100 acquires specified data from the access destination device (step S64). Furthermore, relay device 100 determines if a conversion command is included in the query (or a result of replacing the alias in the query with the character string associated with the alias) (step S66).

If a conversion command is included in the query (step S66: YES), relay device 100 performs conversion processing in accordance with the conversion command (step S68). On the other hand, when the query does not include a conversion command (step S66: NO), the processing in step S68 is skipped.

Subsequently, relay device 100 generates response data by forming the acquired data in a predetermined data format (step S70), and transmits the response data to a transmission source of the query (step S72).

As described above, relay device 100 transmits the data acquired by performing the determined processing to the transmission source of the query (steps S64 to S72). Then, the processing ends.

The above processing procedure implements management of the alias and processing of the query including the alias.

F. Automatic Generation Processing of Alias

The above description describes a processing example. In the processing example, the user specifies the alias and the character string associated with the alias, whereby the alias and character string are registered in alias definition 180. In addition to such manual registration processing, an automatic generation processing of an alias as described below may be implemented.

(f1: Automatic Generation Processing of Alias)

FIG. 12 is a flowchart illustrating a processing procedure related to automatic generation of an alias in control system 1 according to the present embodiment. Each step illustrated in FIG. 12 is typically implemented by processor 102 of relay device 100 executing relay processing program 124.

With reference to FIG. 12, relay device 100 searches for control devices 200 connected to network 2 (step S100). For example, an address resolution protocol (ARP), a ping, or the like is used to search control devices 200.

Subsequently, relay device 100 selects one of retrieved control devices 200 (step S102). Then, relay device 100 searches for a device connected to the selected control device 200 (step S104). To search for the device, it is possible to use a protocol such as CIP Identity object reading.

Subsequently, relay device 100 acquires variable information and actual configuration Information from the retrieved device (step S106). In order to acquire the variable information and the actual configuration information, it is possible to use a command specific to inter-unit communication, an EtherCAT command, an IO-Link command, and the like. Then, relay device 100 determines a character string (including an access path) and a temporary alias name for each piece of data included in the acquired variable information (step S108).

Furthermore, if there is a device other than the retrieved device, relay device 100 acquires I/O information from such device (step S110). In order to acquire the I/O information, it is possible to use a protocol such as CIP Identity object reading.

Finally, relay device 100 determines a character string and a temporary alias for each accessible device on the basis of the acquired actual configuration information, device information, device setting file information, and the like (step S112).

That is, in step S108, the access path and the alias to access specific data are automatically generated, and in step S112, the access path and the alias to access a specific device are automatically generated.

Relay device 100 determines if the processing has been completed for all the retrieved control devices 200 (step S114). If, among the retrieved control devices, there is control device 200 for which processing has not been completed (step S114: NO), relay device 100 selects another control device 200 (step S116). Then, the processing of step S104 and the subsequent steps is repeated.

If the processing has been completed for all the retrieved control devices 200 (step S114: YES), the processing ends.

By employing the automatic generation processing of an alias as described above, the following advantages are provided.

That is, it is possible to automatically generate candidates for an access path and its associated alias name to access data that is held, managed, or generated by control device 200 included in the control system, and at the same time, it is possible to automatically generates candidates for an access path and its associated alias name to access data that is held, managed, or generated by a device connected to control device 200.

Furthermore, it is possible to automatically generate an access path to control device 200 included in the control system and a device connected to control device 200, and to automatically generate a candidate for the alias name associated with the access path.

Furthermore, it is possible to display a list of the generated candidates for the alias names and the access paths associated with the candidates. Note that the candidate for the alias name may be automatically determined in accordance with a predetermined rule, or may be automatically determined on the basis of the associated access path.

As described above, relay device 100 may be configured to be capable of performing generation processing in which relay device 100 searches for control device 200 and device 250 included in control system 1 and generates a combination of an alias name (first character string) and a character string (second character string) such as an access path (alias setting module 152 illustrated in FIG. 5).

(f2: Filtering at Time of Generation of Alias)

In the above-described automatic generation processing of an alias, an alias indicating an access path is basically generated for all of accessible data and devices. At this time, a range of the generated alias may be set freely. That is, filtering on the aliases and the corresponding character strings to be generated may be set. As items of such filtering, the following items can be used.

- Network range (for example, IP network address, network hierarchy, protocol type, and the like)
- Step (for example, coating process, assembly process, inspection process, and the like)
- Device profile (for example, packaging machine, molding machine, and the like)
- Equipment manufacturer (for example, A company, B company, and the like)
- Device name (for example, line A_XX Machine and the like)
- In-device module (for example, mechanism A, mechanism B, and the like)
- Device operation time
- Device status attribute (for example, normal, abnormal, and the like)
- Device log attribute (for example, normal, abnormal, and the like)
- Device vendor (for example, A company, B company, and the like)
- Device profile (for example, controller, remote I/O, sensor, servo, and the like)
- Device name
- Attribute of variable (for example, name, size, input/output, data type, and the like)
- Device operation time and number of operations (for example, the number of times of on and off of contact point, and the like)
- Arbitrary identification values for device and process A user may optionally specify one or more of the items as described above so that only an alias satisfying specified conditions will be automatically generated.

Implementation of such filtering provides the following advantages.

Specifically, only required aliases are generated in accordance with a purpose and use, and it is therefore possible to reduce the number of man-hours required to design and manufacture a system using an alias.

In addition, because only the alias meeting the specified condition is generated, a time required to generate the alias can therefore be shortened, and it is possible to reduce a network load caused at the time of generating the alias can be reduced.

As described above, relay device 100 may generate a combination of an alias name (first character string) and a character string (second character string) such as an access path that meet a predetermined condition (alias setting module 152 illustrated in FIG. 5).

(f3: Selection and Registration of Alias)

In the above-described automatic generation processing of an alias, basically, a candidate of an access path is generated for all of accessible data and devices. Thereafter, among the generated alias candidates, only those designated freely by the user may be registered in alias definition 180.

Figure 13:
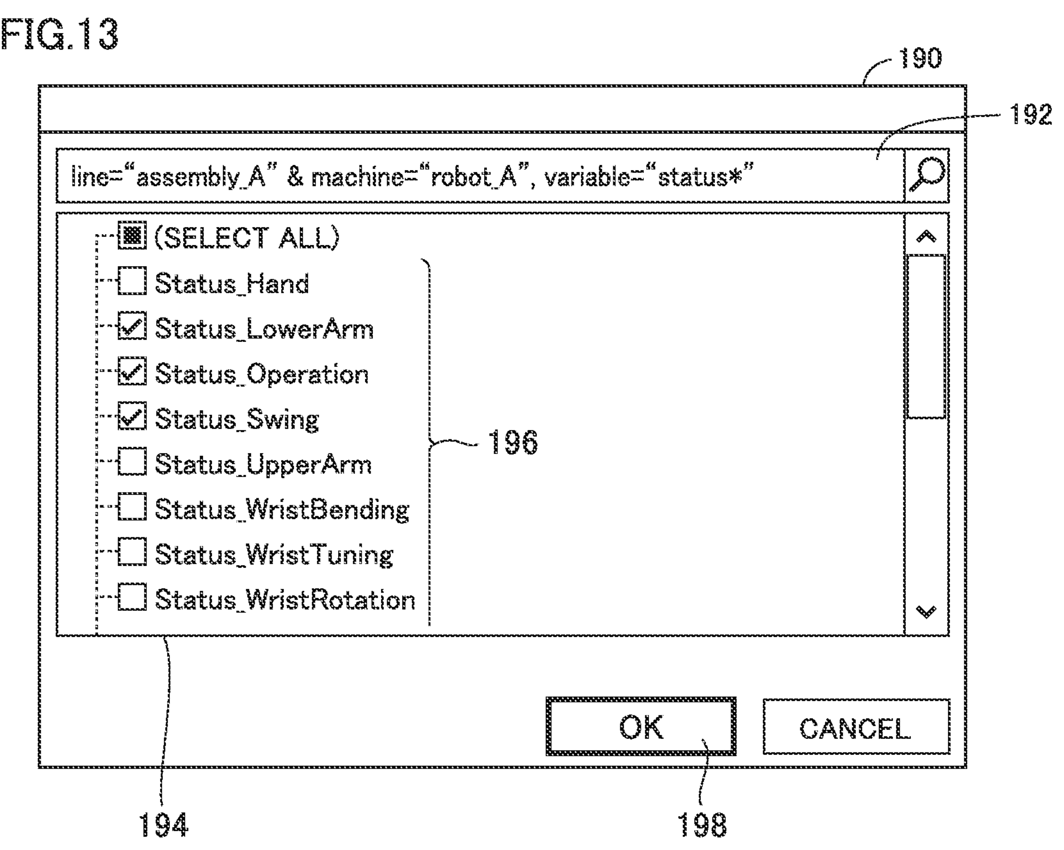
FIG. 13 is a schematic diagram illustrating an example of a user interface screen to select aliases in the control system according to the present embodiment.

FIG. 13 is a schematic diagram illustrating an example of a user interface screen 190 to select aliases in control system 1 according to the present embodiment. With reference to FIG. 13, a list 196 of generated alias candidates is displayed on user interface screen 190. When the user inputs a desired condition in a condition input form 192, check boxes 194 of candidates that meet the input condition are checked in list 196 of the alias candidates.

When the user finally selects an OK button 198, the alias candidates that were checked at the time of selection are registered in alias definition 180.

FIG. 14 is a flowchart illustrating a processing procedure related to selection and registration of aliases in control system 1 according to the present embodiment. Each step illustrated in FIG. 14 is typically implemented by processor 102 of relay device 100 executing relay processing program 124.

With reference to FIG. 14, relay device 100 outputs a user interface screen including the list of the generated aliases candidates (step S150). When receiving the condition that is input in the condition input form (step S152), relay device 100 extracts the aliases that meet the input condition (step S154). Then, relay device 100 checks the check boxes corresponding to the extracted aliases (step S156).

Finally, in response to the selection of the OK button by the user, relay device 100 registers the checked aliases in alias definition 180 (step S158). Then, the alias registration processing ends.

Implementation of such alias registration processing provides the following advantages.

Specifically, among a large number of automatically generated aliases, only the aliases required by the user can be appropriately extracted and registered in alias definition 180. As described above, relay device 100 may register, in alias definition 180, only the combination selected freely from among the combinations of the generated alias names (first character strings) and the character strings (second character strings) such as an access path (alias setting module 152 illustrated in FIG. 5).

(f4: Performing Form on External Device)

In the above description, a typical example has been described in which relay device 100 performs processing such as filtering, selection, and registration of aliases; however, the present invention is not limited thereto, and at least some of the functions provided by relay device 100 may be provided by an external information processing device (for example, a development support device).

G. Dynamic Update of Alias

As described above, alias definition 180 stores alias names and character strings in association with each other. In some cases, after an alias is registered in alias definition 180, the configuration of the target control system 1 may be changed. In such a case, it is necessary to update the alias name and/or the alias path. An example of such update processing of the alias will be described.

FIG. 15 is a schematic diagram illustrating an example of updating aliases in control system 1 according to the present embodiment. FIG. 15(A) illustrates an example in which a network configuration including network addresses is changed. FIG. 15(B) illustrates an example in which a module in the control device is changed.

With reference to FIG. 15(A), for example, it is assumed that the network addresses (IP addresses) of the control devices have been changed from "192.168.1.XX" to "192.168.2.XX". Then, it is necessary to update target parts of a character strings 188 associated with alias names 186.

With reference to FIG. 15(B), it is assumed that the module in the control device is changed. Then, the target part of character strings 188 need to be updated, and the associated alias names 186 also need to be updated. Specifically, in a case where the character string indicating the target module is used as alias names 186, it is necessary to update the character strings in accordance with the change of the target module.

The change in the configuration of control system 1 as described above can occur due to set-up change, device replacement, or the like. When the configuration of control system 1 is changed, it is necessary to update alias names 186 and character strings 188 constituting the aliases. Hereinafter, an example of a method of updating aliases will be described.

Figure 16:
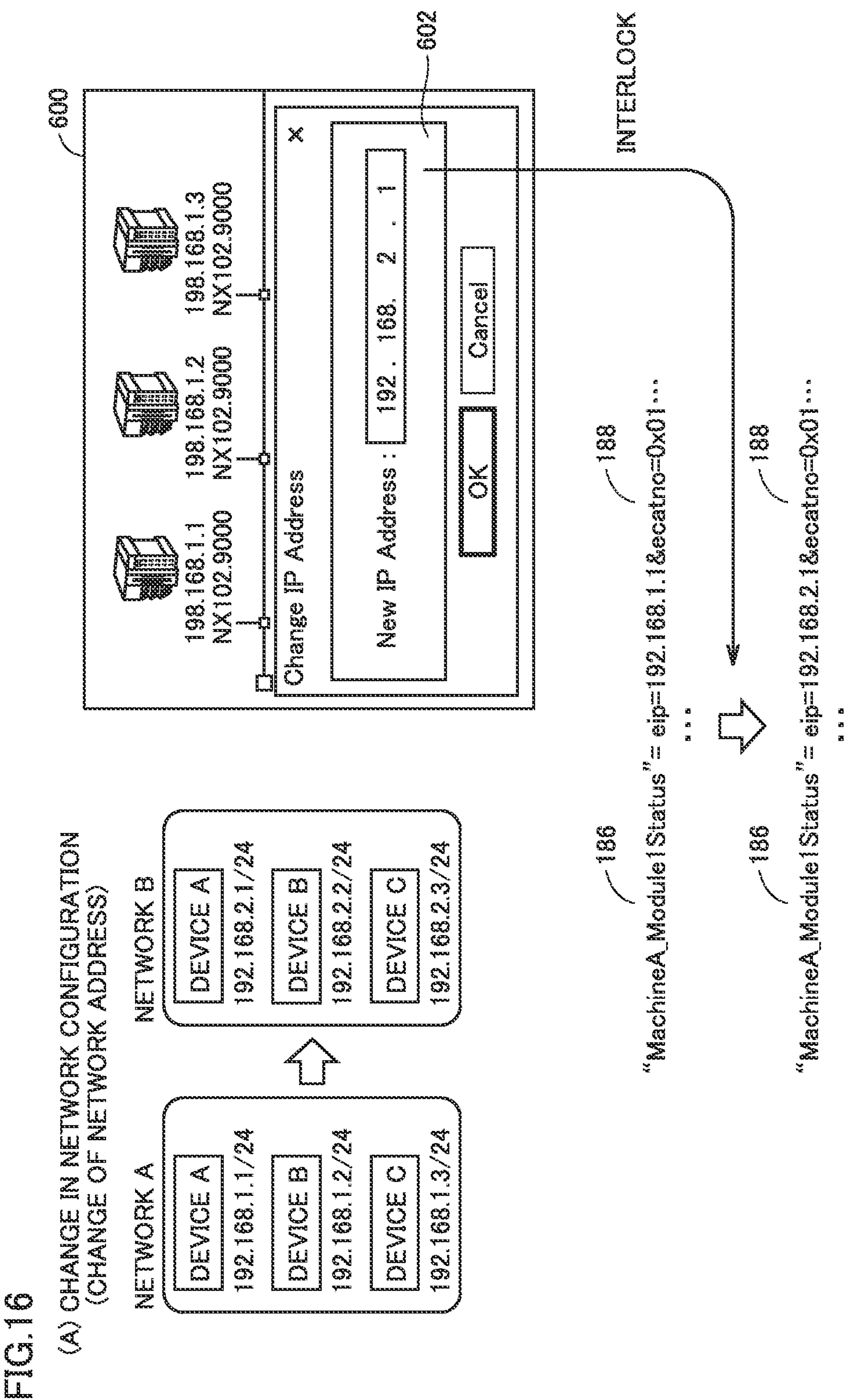
FIG. 16 is a schematic diagram illustrating an example of processing of updating aliases in accordance with a change in a network configuration in the control system according to the present embodiment.

FIG. 16 is a schematic diagram illustrating an example of processing of updating aliases in accordance with a change in a network configuration in control system 1 according to the present embodiment. With reference to FIG. 16, a development support device connected to control device 200 or relay device 100 provides a user interface screen 600 for setting and changing the network configuration of control system 1.

The user can set or change network addresses (IP addresses) of control devices 200 on user interface screen 600. More specifically, user interface screen 600 displays a setting dialog 602 to receive a setting of a network address of each control device 200. New settings are provided from the development support device to control devices 200, so that the network addresses of control devices 200 are changed.

With such changes of the network addresses, relay device 100 updates the target parts of character strings 188 associated with alias names 186.

FIG. 17 is a schematic diagram illustrating an example of processing of updating aliases in accordance with a change of a module in control device 200 of control system 1 according to the present embodiment. With reference to FIG. 17, the development support device connected to control device 200 or relay device 100 provides a user interface screen 610 for setting and changing the module configuration of control device 200 of control system 1.

The user can set or change the module configuration of control device 200 on user interface screen 610. More specifically, user interface screen 610 visually displays the devices connected to the selected control device 200. Then, user interface screen 610 can receive a drag and drop operation of an object indicating a module 612 to be added or changed. The setting of the module configuration of control device 200 is changed by such a drag and drop operation. New settings are provided from the development support device to control device 200, so that the module configuration of control device 200 is changed.

With such a change in the module configuration of control device 200, relay device 100 updates the target parts of character strings 188 associated with alias names 186, and relay device 100 also updates alias names 186 as necessary.

In order to update the aliases as described above, relay device 100 preferably manages the access paths of the aliases by the relative path (path expression based on a specific hierarchy). Since the relative path is used for management, when the configuration of any layer is changed, the access path related to the changed layer can be more easily changed.

When processing is implemented in which, as illustrated in FIGS. 16 and 17, alias names 186 and character strings 188 are automatically updated in conjunction with the operation of the development support device by the user, it is possible to reduce time and effort required for the user to update the aliases, and it is possible to prevent the user from forgetting to update the aliases.

As described above, relay device 100 may perform update processing of updating the content of the combinations of the alias name (first character string) and the character string (second character string) such as an access path included in alias definition 180 in accordance with a change in the configuration in control system 1.

H. Other Embodiments

The present specification has mainly described a configuration example in which relay device 100 acquires data from an access destination each time in response to a query, but it is also possible to employ a configuration in which relay device 100 performs temporary storage (so-called cache) of data. Furthermore, relay device 100 may function like a proxy and acquire data in advance from control devices 200 and the devices included in control system 1, and may store the data in its own database.

The present specification has mainly described an example in which relay device 100 independent of control device 200 and display device 300 performs processing related to the query, but control device 200 or display device 300 may perform processing similarly to the above-described relay device 100.

Furthermore, relay device 100 and control device 200 or display device 300 may cooperate to implement the above processing related to the query. In this case, the above-described functions necessary for the processing related to the query are disposed, in a distributed manner, in a plurality of devices among relay device 100, control device 200, and display device 300.

Furthermore, some or all of the functions to implement the processing related to the query performed by relay device 100 may be implemented by using a resource called a cloud on a network. For example, alias definition 180 may be stored in a database on the cloud.

As described above, any hardware configuration may be used to implement the processing related to the query, and there is appropriately selected hardware in accordance with each period in history or hardware in accordance with required performance.

I. Additional Statements

The present embodiment as described above includes the following technical ideas.

[Configuration 1]

A control system (1) including one or more control devices (200), comprising:

- a processing unit (10: 154) configured to determine processing for the one or more control devices or a device connected to the one or more control devices in accordance with an access request (500, 510, 520, 530, 540, 541, 548);
- a providing unit (40: 160, 162, 164) configured to transmit data acquired by performing the determined processing to a transmission source of the access request;
- a storage unit (30: 108) configured to store a character string definition (180) including at least one combination of a first character string (182, 186) and a second character string (184, 188) longer than the first character string; and
- an interpretation unit (20: 156) configured to replace the first character string included in the access request with the second character string associated with the first character string by referring to the character string definition.

[Configuration 2]

The control system according to configuration 1, wherein the interpretation unit is configured to interpret, as the first character string, a character string concatenated with a specific character string (512) included in the access request.

[Configuration 3]

The control system according to configuration 1 or 2, wherein the access request includes an access path representing a path for accessing the control device or the device included in the control system.

[Configuration 4]

The control system according to any one of configurations 1 to 3, wherein the access request includes a conversion command that specifies conversion processing on the data acquired from the control device or the device included in the control system.

[Configuration 5]

The control system according to any one of configurations 1 to 4, further comprising a generation unit configured to search for the control device and the device included in the control system to generate a combination of a first character string and a second character string.

[Configuration 6]

The control system according to configuration 5, wherein the generation unit is configured to generate the combination of the first character string and the second character string that meets a predetermined condition.

[Configuration 7]

The control system according to configuration 5 or 6, further comprising a registration unit configured to register, in the character string definition, only any combination selected from among combinations of a first character string and a second character string that are generated by the generation unit.

[Configuration 8]

The control system according to any one of configurations 1 to 7, further comprising an update unit configured to update, in accordance with a change in a configuration in the control system, a content of the combination of a first character string and a second character string included in the character string definition.

[Configuration 9]

A data providing method in a control system including one or more control devices (200), the data providing method comprising:

referring to a character string definition (180) including at least one combination of a first character string and a second character string (184, 188) longer than the first character string (182, 186), and replacing the first character string included in an access request (500, 510, 520, 530, 540, 541, 548) with a corresponding second character string (S50 to S60);

determining processing for the one or more control devices or a device connected to the one or more control devices in accordance with the access request (S62); and transmitting data acquired by performing the determined processing to a transmission source of the access request (S64 to S72).

[Configuration 10]

A relay processing program (124) for providing data to be executed by a computer associated with a control system (1) including one or more control devices (200), the relay processing program causing the computer to perform:

referring to a character string definition including at least one combination of a first character string and a second character string longer than the first character string, and replacing the first character string included in an access request (500, 510, 520, 530, 540, 541, 548) with a corresponding second character string (S50 to S60);

determining processing for the one or more control devices or a device connected to the one or more control devices in accordance with the access request (S62); and transmitting data acquired by performing the determined processing to a transmission source of the access request (S64 to S72).

J. Advantages

In the control system according to the present embodiment, since an access request (query) can be described by using an alias, time and effort to generate the query can be reduced. In addition, since a specific access path can be concealed, security performance can be improved. Furthermore, in a case where the configuration of control system 1 or the like is changed, the registered contents of alias definition 180 may be updated in accordance with the configuration after the change, so that the query used before the change can be used as it is; therefore, it is possible to flexibly cope with the change in the configuration of control system 1.

It should be understood that the embodiments disclosed herein are illustrative in all respects and are not restrictive. The scope of the present invention is defined not by the above description but by the claims, and is intended to include all modifications within meanings and scope relevant to the claims.

REFERENCE SIGNS LIST

1: control system, 2, 4: network, 6: field network, 10: processing unit, 20: interpretation unit, 30: storage unit, 40: providing unit, 100: relay device, 102, 202: processor, 104: optical drive, 105: recording medium, 106, 206: main storage device, 108, 208: secondary storage device, 110, 212: USB controller, 112, 114: network controller, 116: input unit, 118: display unit, 120: bus, 122: OS, 124: relay processing program, 150: interface module, 152: alias setting module, 154: query processing module, 156: alias interpretation module, 160: communication processing module, 162: data conversion module, 164: data forming module, 170: system information, 171: configuration information, 172: device profile, 173: index, 180: alias definition, 182, 186: alias name, 184, 188: character string, 190, 600, 610: user interface screen, 192: condition input form, 194: check box, 196: list, 198: OK button, 200: control device, 204: chipset, 210: host network controller, 214: memory card interface, 216: memory card, 220: field network controller, 222: internal bus controller, 224: I/O unit, 231: system program, 232: user program, 250: device, 300: display device, 400: information processing device, 500, 510, 520, 530, 540, 541, 548: query, 502: access destination description part, 504, 505, 506, 507, 508, 542, 543: query description part, 512: item, 514, 524, 525, 526, 527, 528, 534, 536, 546: alias, 602: setting dialog

The invention claimed is:

1. A control system including one or more control devices, the control system comprising:

a storage device configured to store a character string definition including at least one combination of a first character string and a second character string longer than the first character string; and a hardware processor and/or a dedicated hardware circuit configured to:

determine processing for the one or more control devices or a device connected to the one or more control devices in accordance with an access request;

transmit data acquired by performing the determined processing to a transmission source of the access request; and replace the first character string included in the access request with the second character string associated with the first character string by referring to the character string definition, wherein the hardware processor and/or the dedicated hardware circuit is further configured to search for the one or more control devices included in the control system to generate the combination of the first character string and the second character string.

2. The control system according to claim 1, wherein the hardware processor and/or the dedicated hardware circuit is configured to interpret, as the first character string, a character string concatenated with a specific character string included in the access request.

3. The control system according to claim 1, wherein the access request includes an access path representing a path for accessing the one or more control devices included in the control system.

4. The control system according to claim 1, wherein the access request includes a conversion command that specifies conversion processing on the data acquired from the one or more control devices included in the control system.

5. The control system according to claim 1, wherein the hardware processor and/or the dedicated hardware circuit is configured to generate the combination of the first character string and the second character string that meets a predetermined condition.

6. The control system according to claim 1, wherein the hardware processor and/or the dedicated hardware circuit is further configured to register, in the character string definition, only any combination selected from among combinations of a first character string and a second character string that are generated.

7. The control system according to claim 1, wherein the hardware processor and/or the dedicated hardware circuit is further configured to update, in accordance with a change in a configuration in the control system, a content of the combination of the first character string and the second character string included in the character string definition.

8. A data providing method in a control system including one or more control devices, the data providing method comprising:

referring to a character string definition including at least one combination of a first character string and a second character string longer than the first character string, and replacing the first character string included in an access request with the second character string associated with the first character string;

determining processing for the one or more control devices or a device connected to the one or more control devices in accordance with the access request; and transmitting data acquired by performing the determined processing to a transmission source of the access request, wherein the data providing method further comprises searching for the one or more control devices included in the control system to generate the combination of the first character string and the second character string.

9. The data providing method according to claim 8, further comprising interpreting, as the first character string, a character string concatenated with a specific character string included in the access request.

10. The data providing method according to claim 8, wherein the access request includes an access path representing a path for accessing the one or more control devices included in the control system.

11. The data providing method according to claim 8, wherein the access request includes a conversion command that specifies conversion processing on the data acquired from the one or more control devices included in the control system.

12. The data providing method according to claim 8, further comprising generating the combination of the first character string and the second character string that meets a predetermined condition.

13. A non-transitory computer-readable storage medium having thereon a relay processing program for providing data, when executed by one or more processors in a computer associated with a control system including one or more control devices, the relay processing program causing the one or more processors to perform:

referring to a character string definition including at least one combination of a first character string and a second character string longer than the first character string, and replacing the first character string included in an access request with a corresponding second character string;

determining processing for the one or more control devices or a device connected to the one or more control devices in accordance with the access request; and transmitting data acquired by performing the determined processing to a transmission source of the access request, wherein the relay processing program further causes the one or more processors to perform searching for the one or more control devices included in the control system to generate the combination of the first character string and the second character string.

14. The non-transitory computer-readable storage medium according to claim 13, wherein the relay processing program further causes the one or more processors to perform interpreting, as the first character string, a character string concatenated with a specific character string included in the access request.

15. The non-transitory computer-readable storage medium according to claim 13, wherein the access request includes an access path representing a path for accessing the one or more control devices included in the control system.

16. The non-transitory computer-readable storage medium according to claim 13, wherein the access request includes a conversion command that specifies conversion processing on the data acquired from the one or more control devices included in the control system.

17. The non-transitory computer-readable storage medium according to claim 13, wherein the relay processing program further causes the one or more processors to perform generating the combination of the first character string and the second character string that meets a predetermined condition.

* * * * *